(12) United States Patent
Hiro et al.

(10) Patent No.: US 12,164,749 B2
(45) Date of Patent: *Dec. 10, 2024

(54) INFORMATION PROCESSING APPARATUS FOR RESPONDING TO FINGER AND HAND OPERATION INPUTS

(71) Applicant: SONY CORPORATION, Tokyo (JP)

(72) Inventors: Daisuke Hiro, Kanagawa (JP); Lyo Takaoka, Tokyo (JP); Akane Yano, Tokyo (JP); Tomoya Narita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/352,372

(22) Filed: Jul. 14, 2023

(65) Prior Publication Data

US 2023/0367455 A1    Nov. 16, 2023

Related U.S. Application Data

(63) Continuation of application No. 17/030,936, filed on Sep. 24, 2020, now Pat. No. 11,747,958, which is a
(Continued)

(30) Foreign Application Priority Data

Mar. 15, 2012   (JP) .................. 2012-058063

(51) Int. Cl.
*G06F 3/0482* (2013.01)
*G06F 3/01* (2006.01)
(Continued)

(52) U.S. Cl.
CPC ........ *G06F 3/0482* (2013.01); *G06F 3/04817* (2013.01); *G06F 3/04842* (2013.01);
(Continued)

(58) Field of Classification Search
CPC ............... G06F 3/0482; G06F 3/04817; G06F 3/04842; G06F 3/04847; G06F 3/0488;
(Continued)

(56) References Cited

U.S. PATENT DOCUMENTS

| 5,757,358 A | 5/1998 | Osga |
| 6,169,538 B1 | 1/2001 | Nowlan et al. |

(Continued)

FOREIGN PATENT DOCUMENTS

| EP | 1 993 031 A1 | 11/2008 |
| JP | 08-234909 | 9/1996 |

(Continued)

OTHER PUBLICATIONS

International Search Report issued Jun. 18, 2013, in PCT/JP2013/001276, filed Mar. 1, 2013.
(Continued)

*Primary Examiner* — Nicholas Ulrich
(74) *Attorney, Agent, or Firm* — Oblon, McClelland, Maier & Neustadt, L.L.P.

(57) ABSTRACT

An information processing apparatus that controls a display to display an operation target; determines a contact size of an object on the display; and enables or disables an operation input for the operation target based on the contact size.

10 Claims, 13 Drawing Sheets

Related U.S. Application Data continuation of application No. 14/379,931, filed as application No. PCT/JP2013/001276 on Mar. 1, 2013, now abandoned.

(51) Int. Cl.
| | |
|---|---|
| *G06F 3/04817* | (2022.01) |
| *G06F 3/04842* | (2022.01) |
| *G06F 3/04847* | (2022.01) |
| *G06F 3/0488* | (2022.01) |
| *G06F 3/04886* | (2022.01) |
| *H04M 1/72469* | (2021.01) |

(52) U.S. Cl.
CPC ........ *G06F 3/04847* (2013.01); *G06F 3/0488* (2013.01); *G06F 3/04886* (2013.01); *H04M 1/72469* (2021.01); *G06F 3/01* (2013.01); *G06F 2203/04806* (2013.01); *H04M 2250/22* (2013.01)

(58) Field of Classification Search
CPC .................. G06F 3/04886; G06F 3/01; G06F 2203/04806; H04M 1/72469; H04M 2250/22
See application file for complete search history.

(56) References Cited

U.S. PATENT DOCUMENTS

| | | | |
|---|---|---|---|
| 6,211,856 B1 | 4/2001 | Choi et al. | |
| 6,243,091 B1 | 6/2001 | Berstis | |
| 6,259,436 B1 | 7/2001 | Moon et al. | |
| 8,279,241 B2 | 10/2012 | Fong | |
| 8,352,884 B2 | 1/2013 | Zalewski et al. | |
| 8,436,828 B1 | 5/2013 | Zhai | |
| 10,007,401 B2 * | 6/2018 | Hiro ..................... | G06F 3/0482 |
| 11,747,958 B2 * | 9/2023 | Hiro ................. | H04M 1/72469 |
| | | | 715/765 |
| 2008/0094356 A1 | 4/2008 | Ording et al. | |
| 2009/0139778 A1 | 6/2009 | Butler et al. | |
| 2009/0204925 A1 | 8/2009 | Bhat et al. | |
| 2010/0066694 A1 | 3/2010 | Jonsdottir | |
| 2010/0103127 A1 | 4/2010 | Park et al. | |
| 2010/0162171 A1 | 6/2010 | Felt et al. | |
| 2010/0265185 A1 | 10/2010 | Oksanen | |
| 2010/0289752 A1 | 11/2010 | Birkler | |
| 2010/0302212 A1 | 12/2010 | Weber et al. | |
| 2010/0318905 A1 | 12/2010 | Rakesh | |
| 2011/0057886 A1 | 3/2011 | Ng et al. | |
| 2011/0074677 A1 | 3/2011 | Ording et al. | |
| 2011/0254865 A1 | 10/2011 | Yee et al. | |
| 2011/0316888 A1 | 12/2011 | Sachs et al. | |
| 2012/0235967 A1 | 9/2012 | Katoh et al. | |
| 2012/0299860 A1 | 11/2012 | Wang et al. | |
| 2013/0019201 A1 | 1/2013 | Cabrera-Cordon et al. | |
| 2013/0120278 A1 | 5/2013 | Cantrell | |
| 2013/0152002 A1 | 6/2013 | Menczel et al. | |
| 2014/0049499 A1 | 2/2014 | Huck | |
| 2018/0129375 A1 | 5/2018 | Arriola et al. | |

FOREIGN PATENT DOCUMENTS

| | | |
|---|---|---|
| JP | 2010-182071 | 8/2010 |
| JP | 2010-186442 | 8/2010 |
| JP | 2012-068778 | 4/2012 |
| JP | 201-113666 | 6/2012 |
| KR | 10-2006-0074287 A | 7/2006 |
| KR | 10-1790838 B1 | 10/2017 |
| WO | 00/38042 A1 | 6/2000 |
| WO | 2004/070604 A2 | 8/2004 |
| WO | 2008/030880 A1 | 3/2008 |

OTHER PUBLICATIONS

Office Action issued Feb. 14, 2017, in Korean Patent Application No. 10-2014-7024837 (with English language translation).

Office Action issued May 24, 2018, in corresponding Korean Patent Application No. 10-2017-7030316 (with English Translation), 5 pages.

Office Action received for Japanese Patent Application No. JP 2012-058063 mailed on Dec. 1, 2015.

* cited by examiner

[Fig. 1]
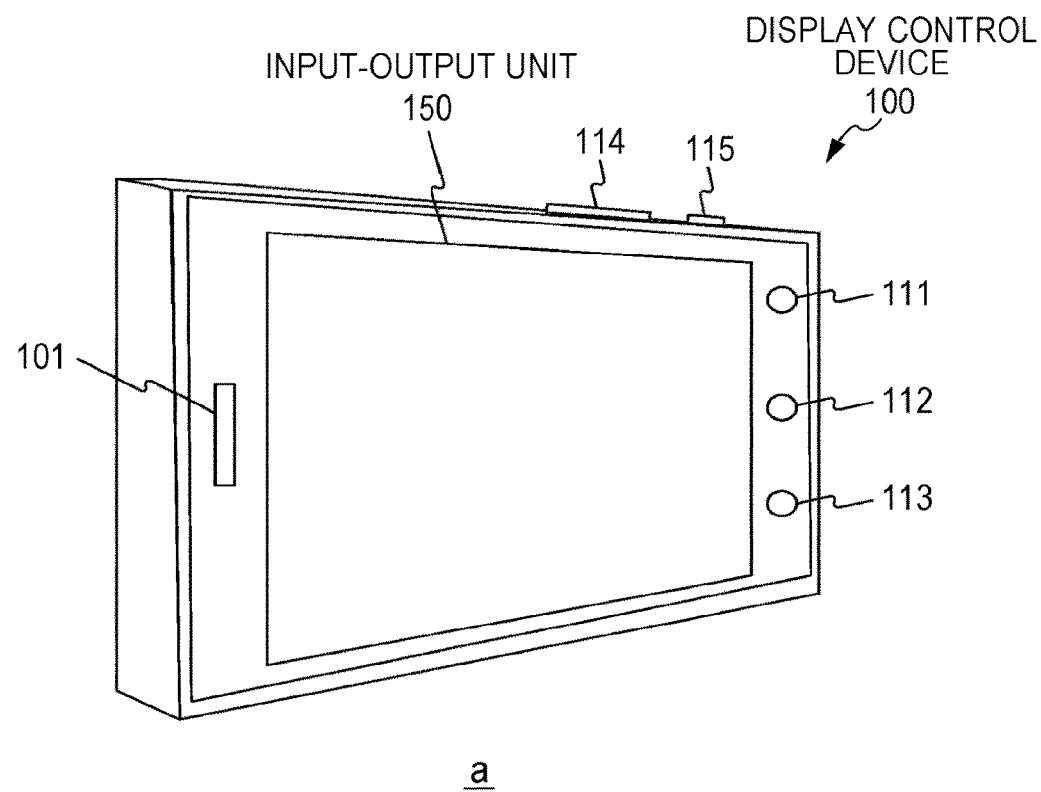
a
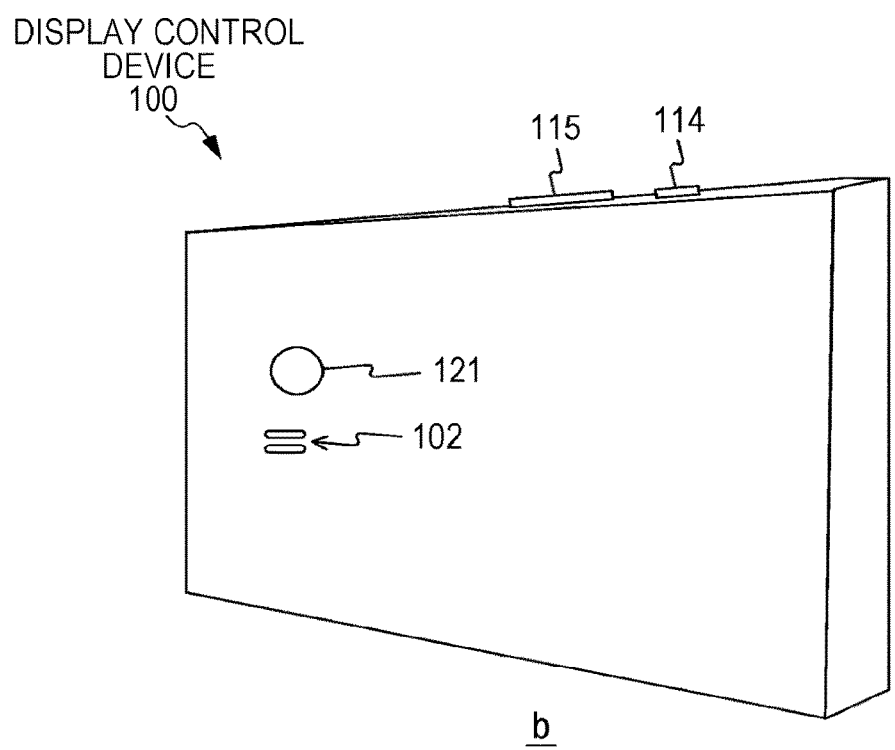
b

[Fig. 2]
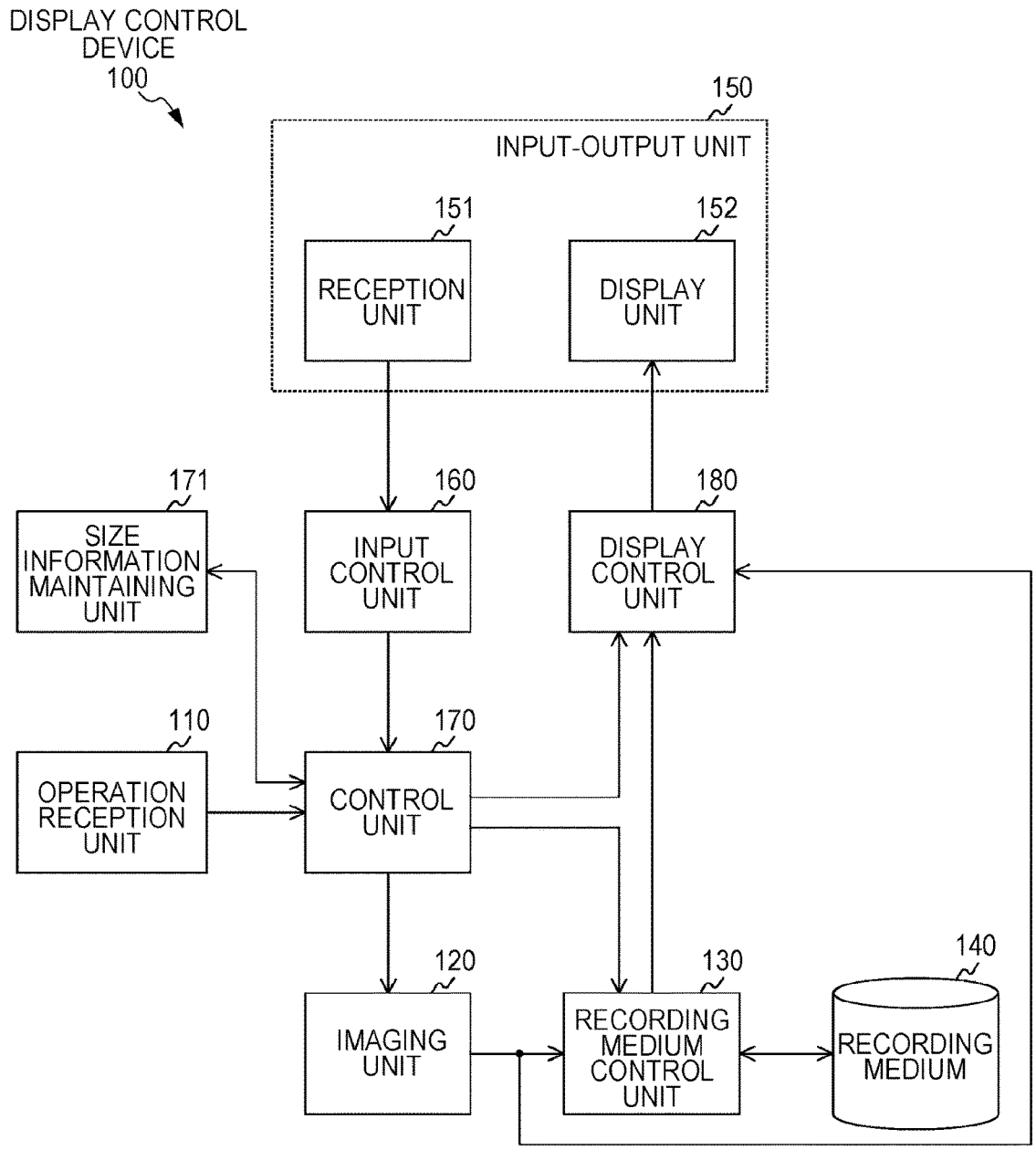

[Fig. 3]
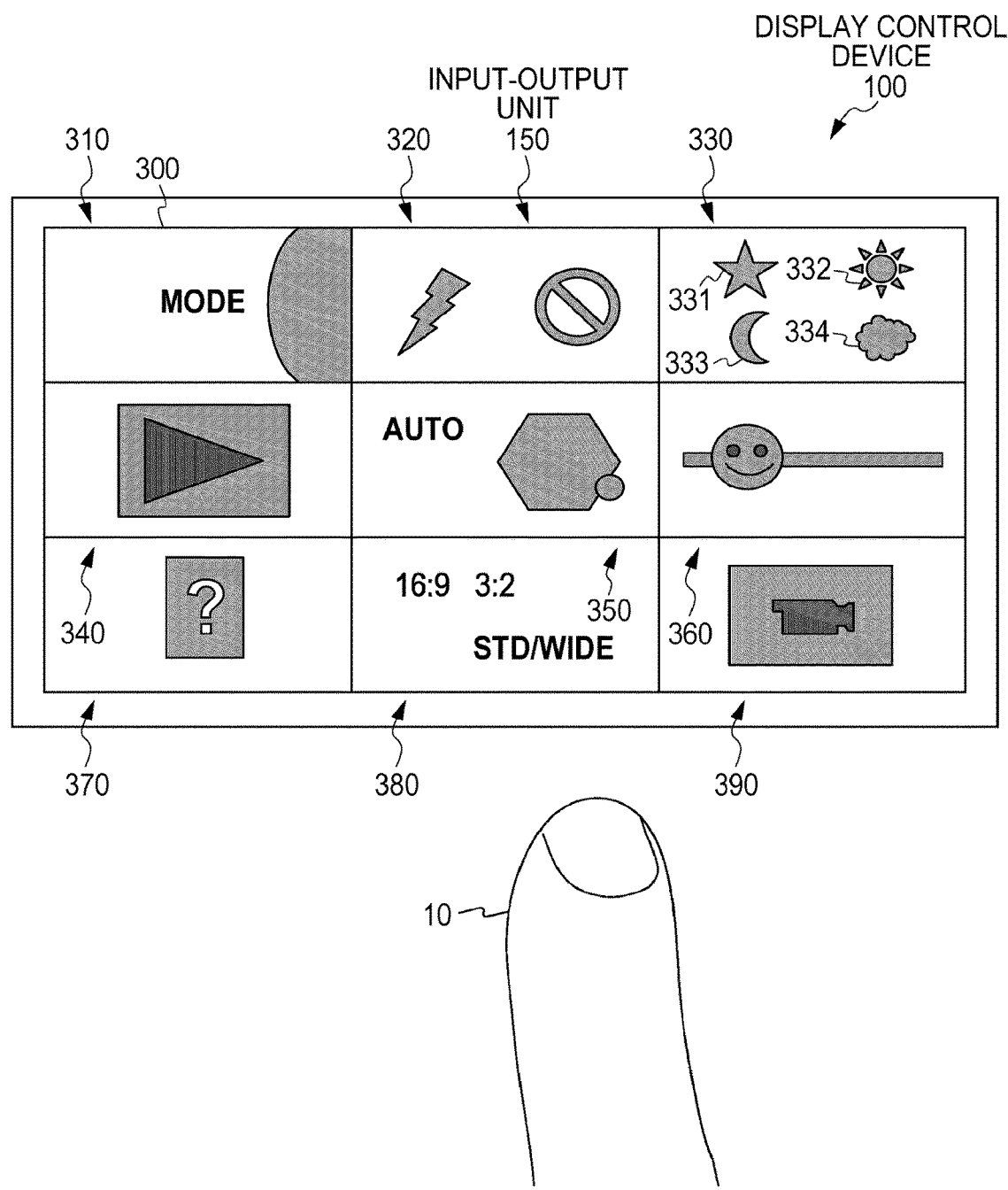

[Fig. 4]
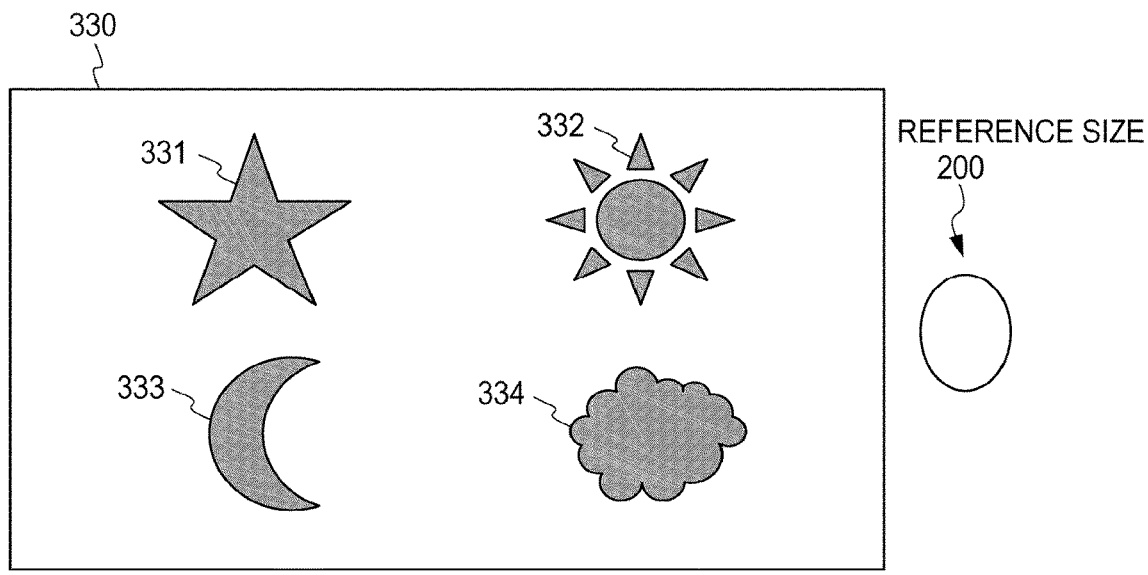
a
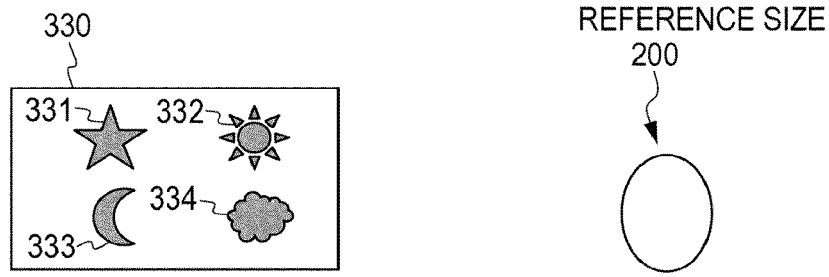
b

[Fig. 5]
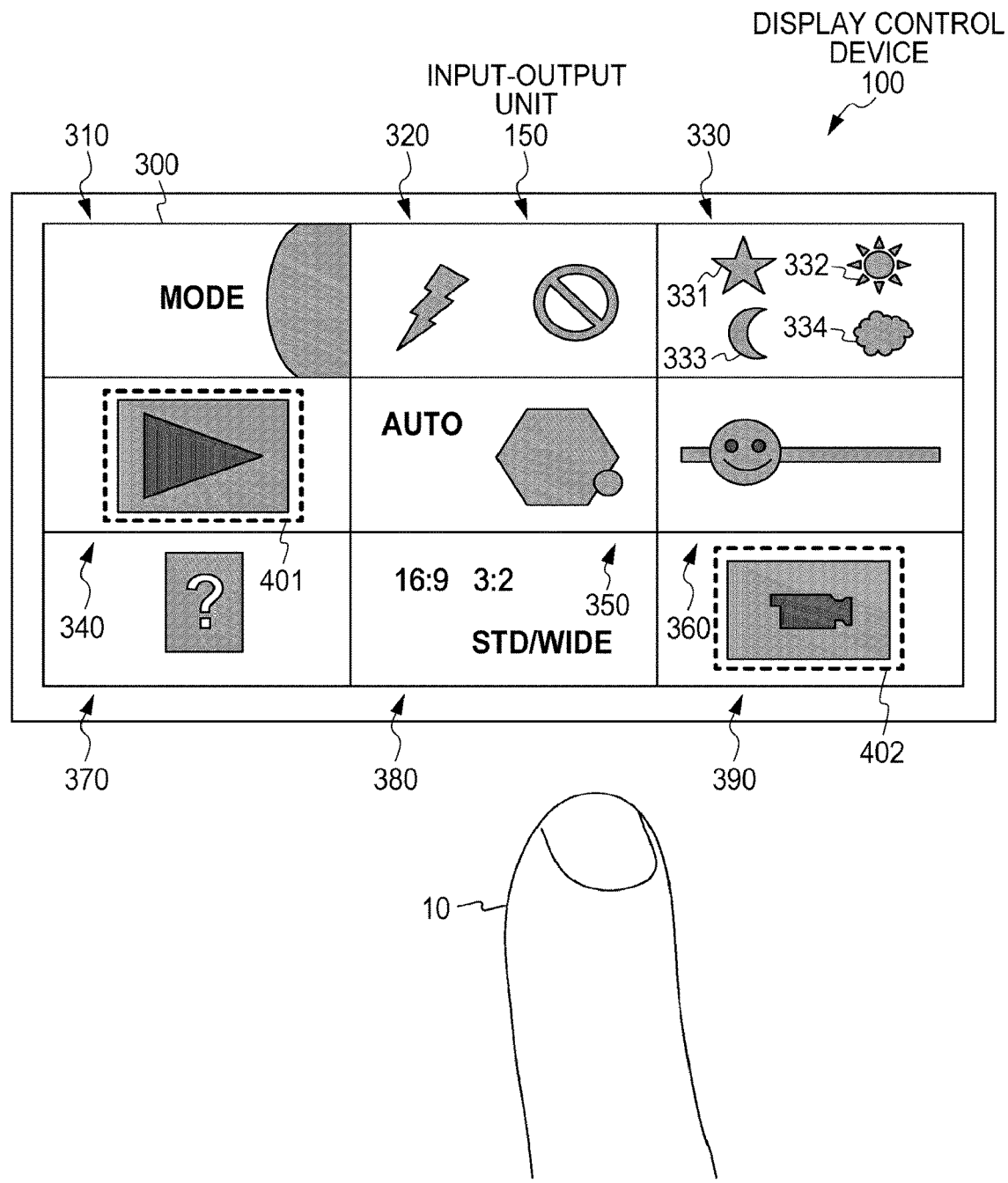

[Fig. 6]
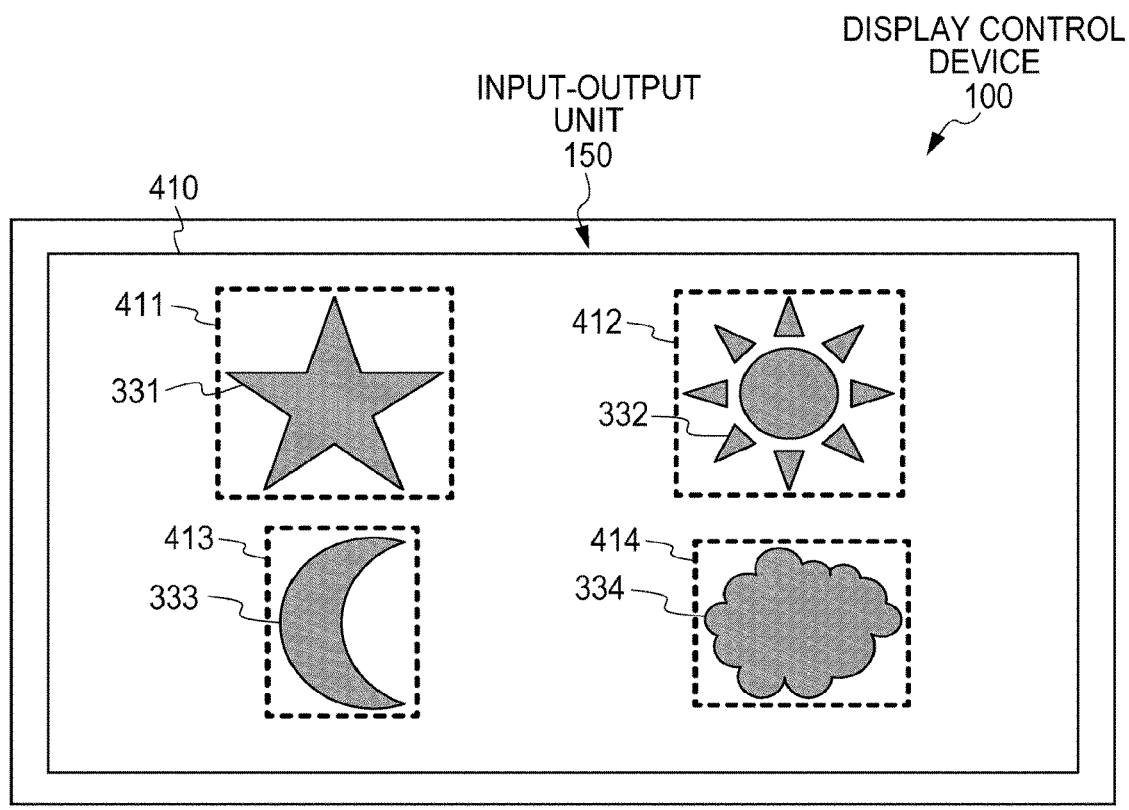
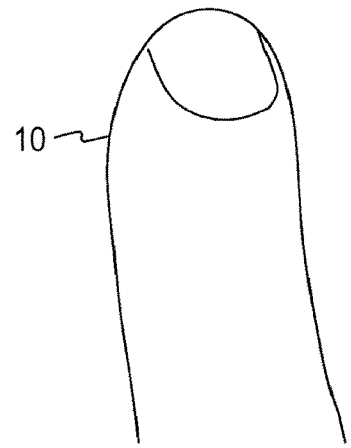

[Fig. 7]
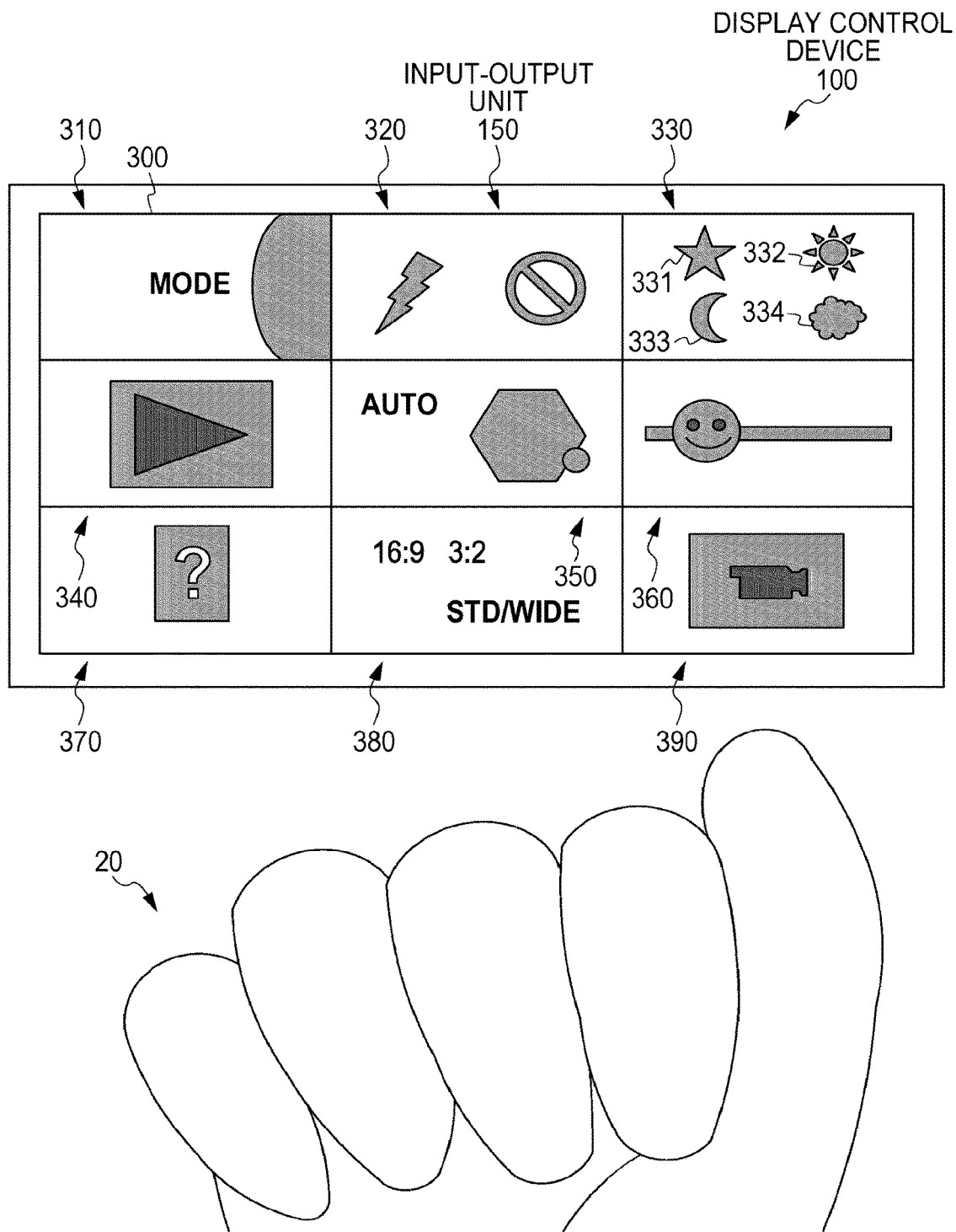

[Fig. 8]
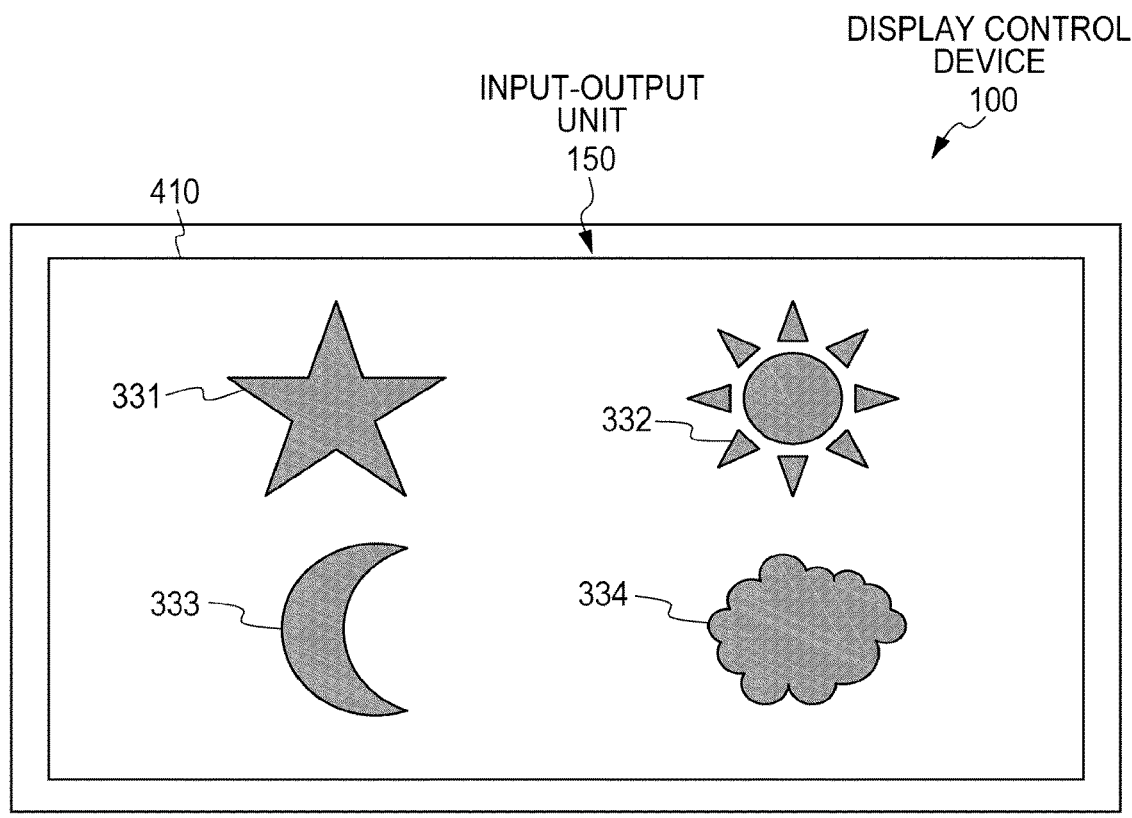
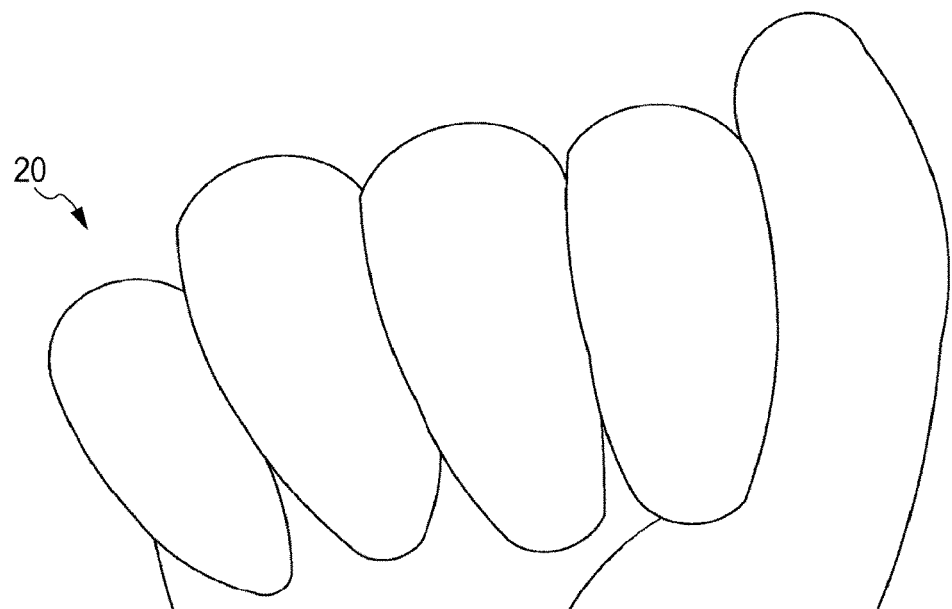

[Fig. 9]
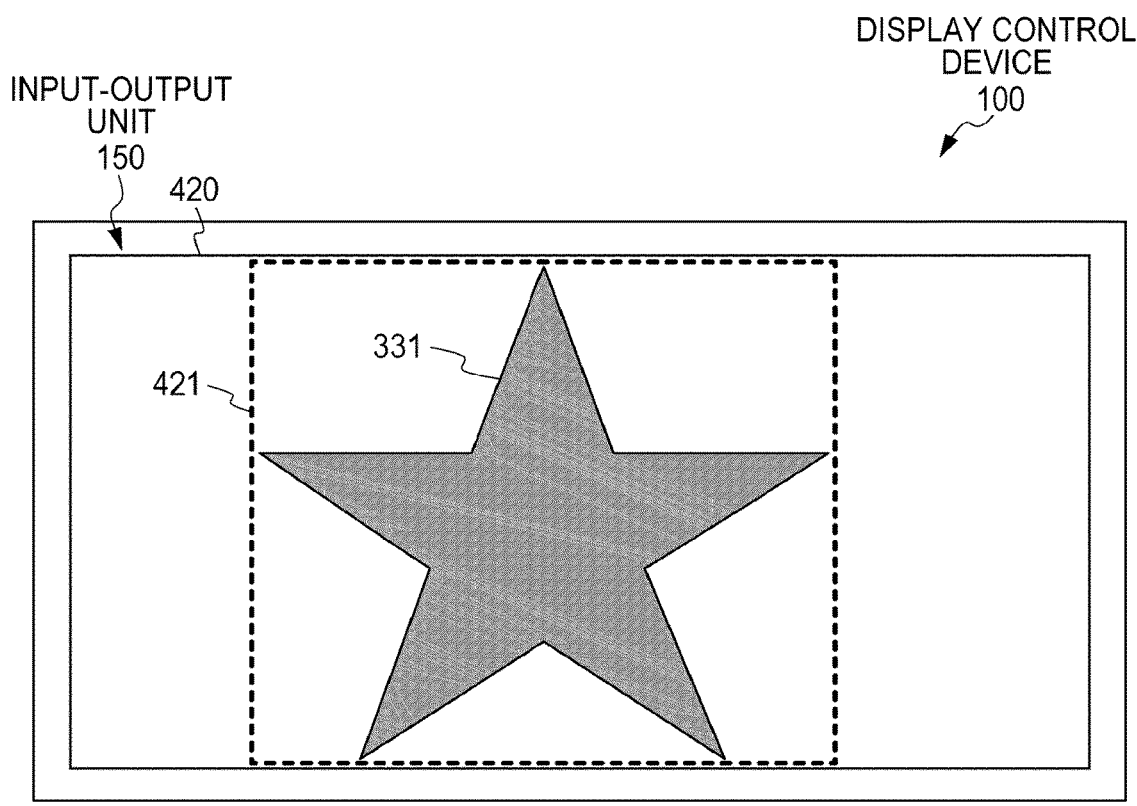

[Fig. 10]
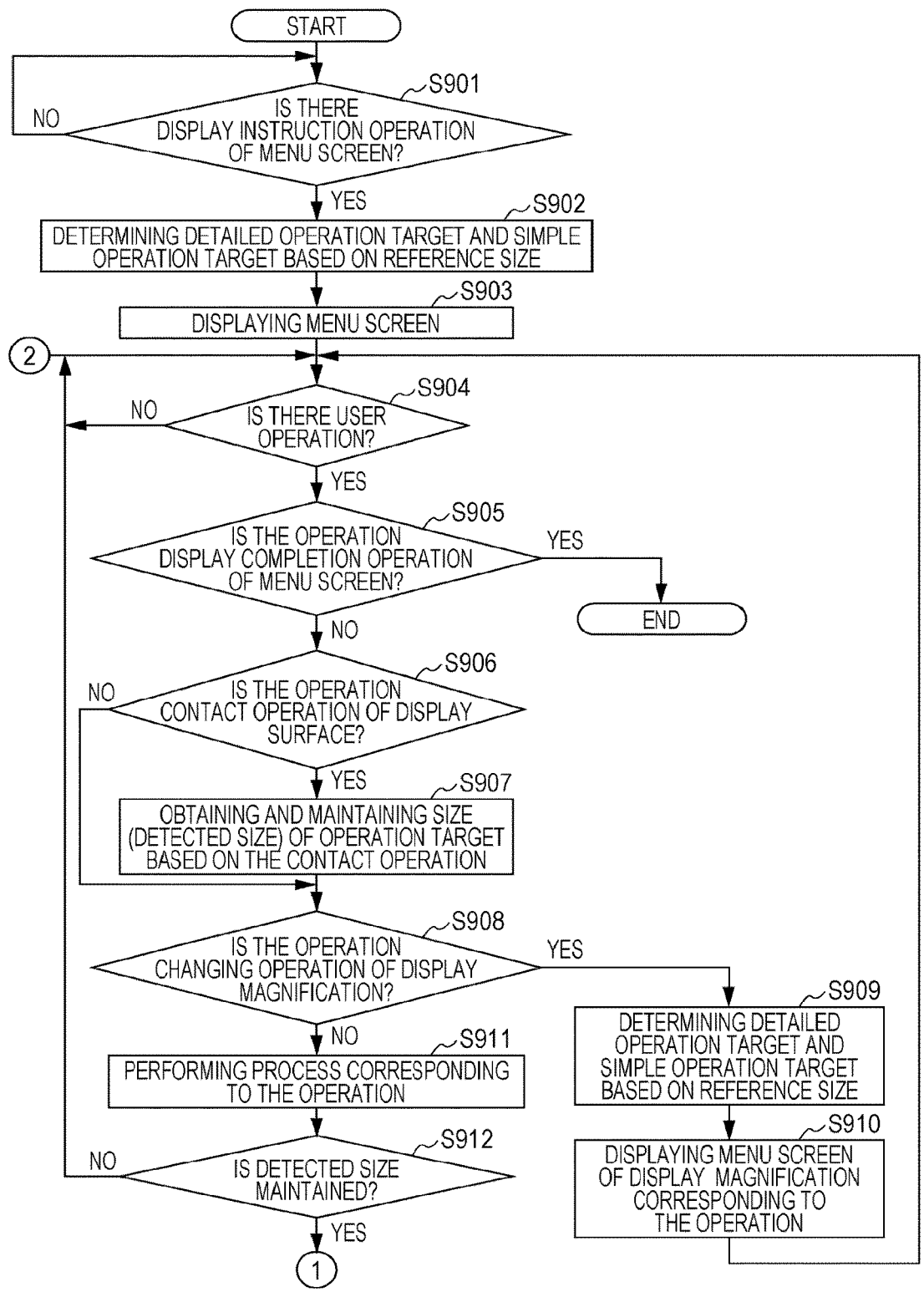

[Fig. 11]
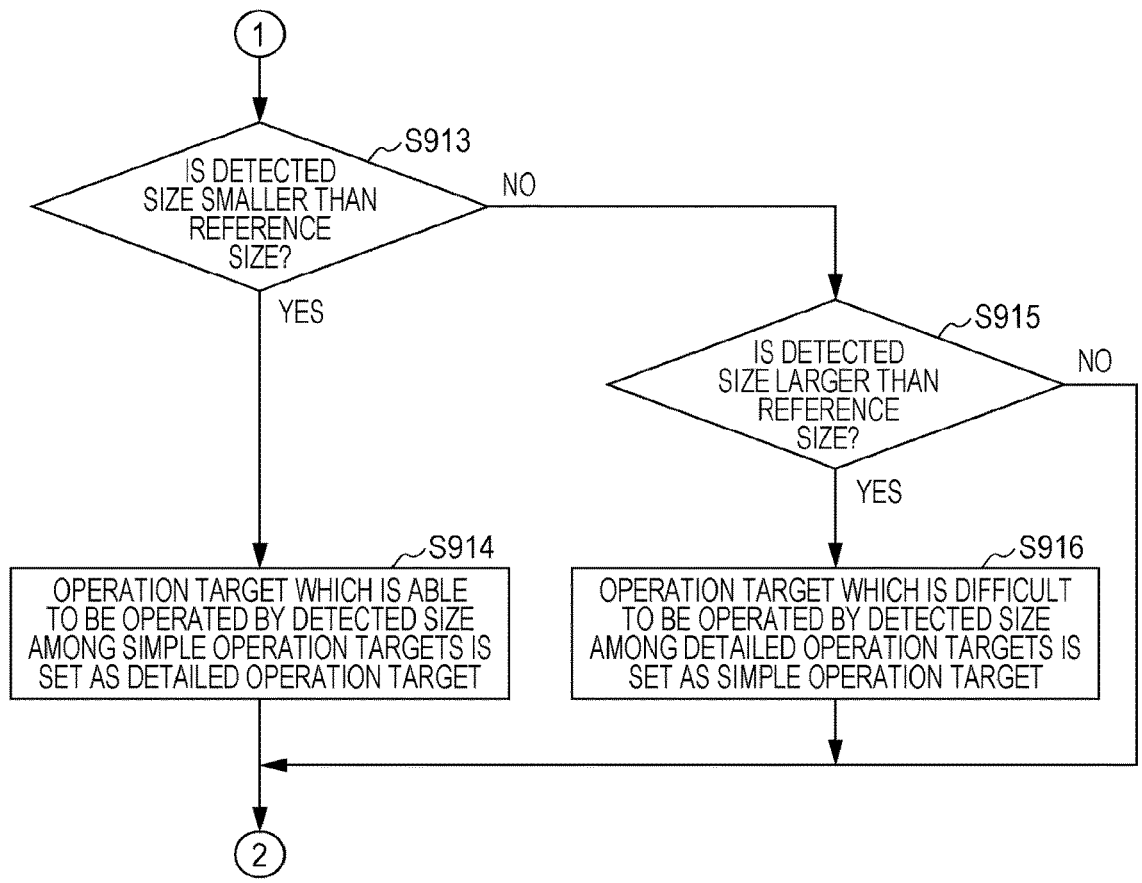

[Fig. 12]
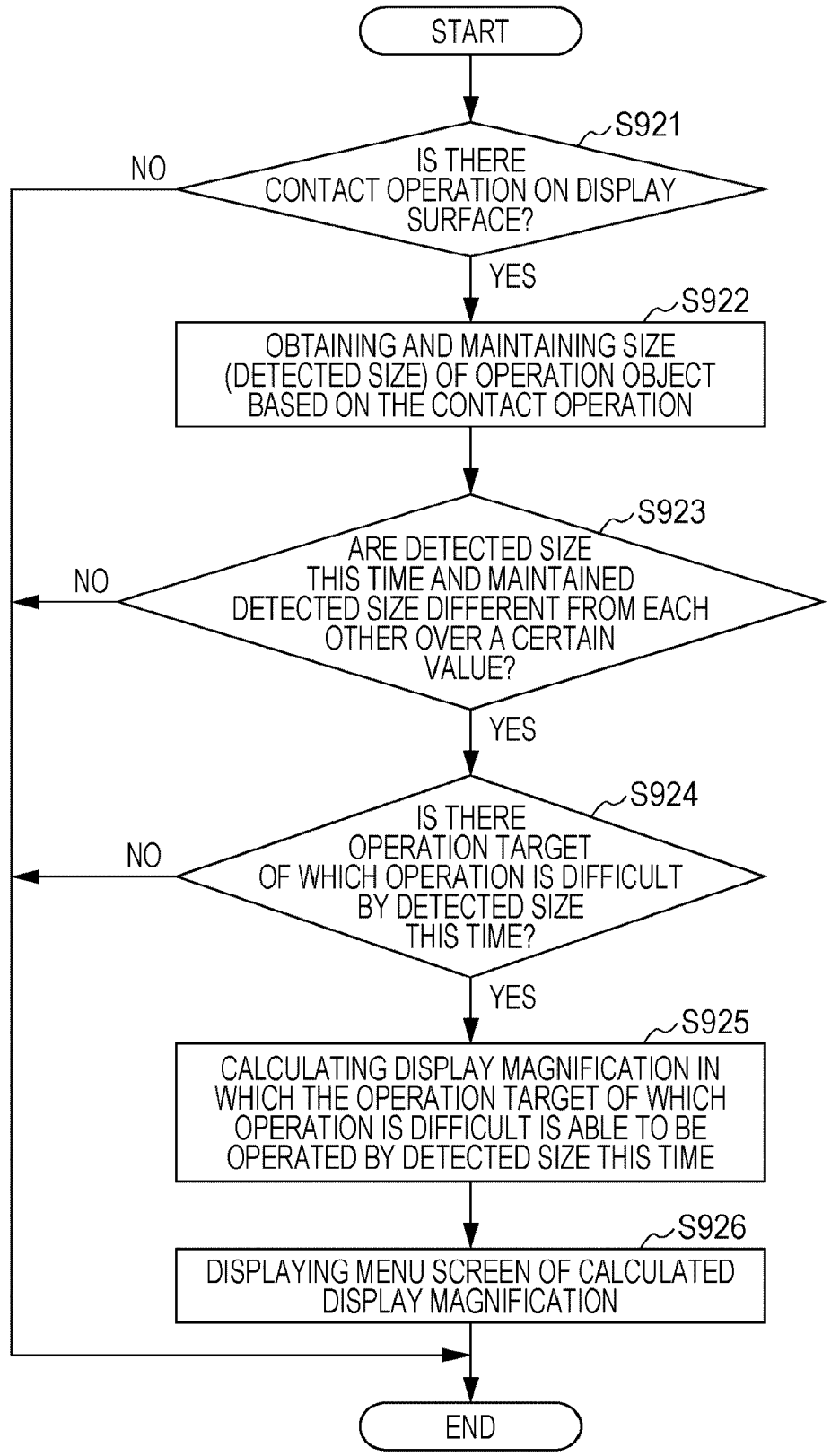

[Fig. 13]
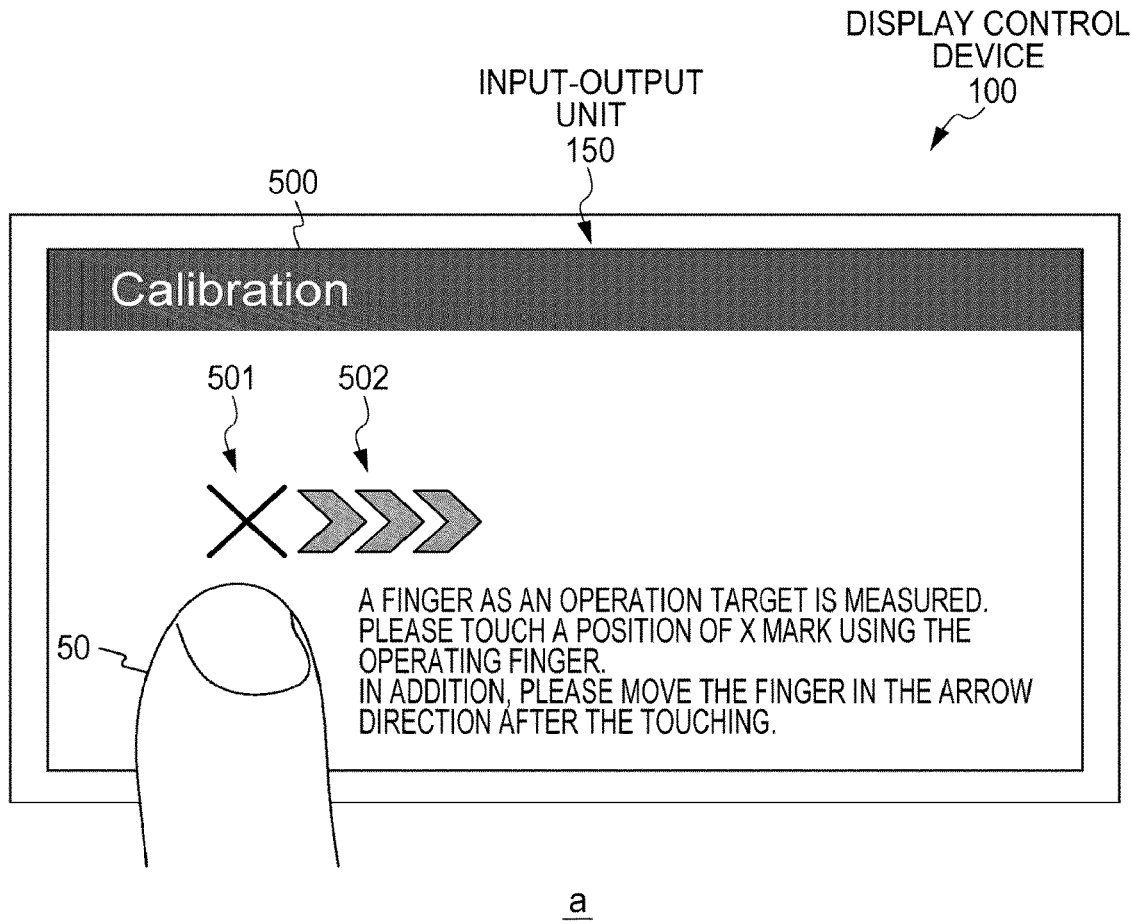
a
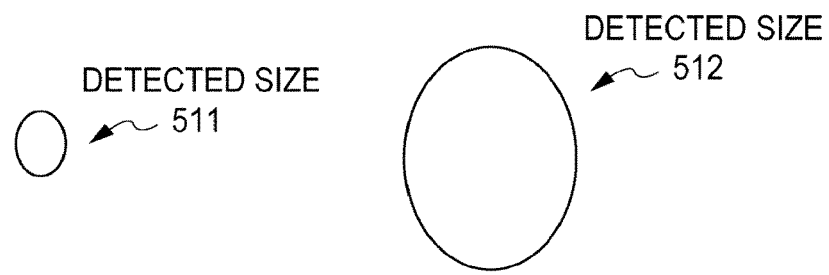
b

INFORMATION PROCESSING APPARATUS FOR RESPONDING TO FINGER AND HAND OPERATION INPUTS

CROSS-REFERENCE TO RELATED APPLICATIONS

This application is a continuation of U.S. application Ser. No. 17/030,936, filed Sep. 24, 2020, which is a continuation of U.S. application Ser. No. 14/379,931, entitled "INFORMATION PROCESSING APPARATUS, METHOD, AND NON-TRANSITORY COMPUTER-READABLE MEDIUM," filed Aug. 20, 2014, and which is the national stage entry of PCT/JP2013/01276, filed Mar. 1, 2013, and which claims priority to Japanese Patent Application No. 2012-058063, entitled "DISPLAY CONTROL DEVICE, METHOD OF CONTROLLING THE SAME AND PROGRAM" filed on Mar. 15, 2012. The contents of these prior applications are incorporated herein by reference in their entirety.

TECHNICAL FIELD

The present technology relates to a display control device, and specifically, relates to a display control device which displays an image, a control method thereof, and a program which causes a computer to execute this method.

BACKGROUND ART

In the related art, an electronic device having a plurality of functions such as a mobile phone, a digital still camera, or the like, has been widespread. In addition, an electronic device is present, in which a menu screen which enables a user to perform each operation for performing a desired function is displayed on a touch panel, and the function according to an operation input of the touch panel is executed.

For example, a display operation device which displays an icon in a large size depending on the distance which increases from a basic point has been suggested (for example, refer to PTL 1).

CITATION LIST

Patent Literature

PTL 1: JP 2009-265793A

SUMMARY

Technical Problem

In the above described related art, it is possible to reduce operational errors, since an icon is displayed in a size corresponding to a contact area of a fingertip on the display surface.

Here, when an electronic device having a plurality of functions is operated, a case in which the number of items as operation targets on a display screen is large is also assumed. For this reason, it is important to prevent operational errors, even when the number of items as the operation targets on the display screen is large.

The present technology has been made in consideration of such a situation, and an object thereof is to prevent operational errors of operation targets on a display screen.

Solution to Problem

An information processing apparatus that controls a display to display an operation target; determines a contact size of an object on the display; and enables or disables an operation input for the operation target based on the contact size.

The processing circuitry may be configured to compare the contact size to a threshold value.

The processing circuitry may be configured to determine the threshold value based on a size of the operation target.

The processing circuitry may be configured to enable or disable the operation input for the operation target based on the comparison.

The circuitry may be configured to enable an operation input for the operation target when the contact size is less than the threshold value.

The circuitry may be configured to disable an operation input for the operation target when the contact size is greater than the threshold value.

The circuitry may be configured to display at least a first operation target and a second operation target, wherein a display size of the first operation target is greater than a display size of the second operation target.

A non-transitory computer-readable medium including computer program instructions, which when executed by an information processing apparatus, causes the information processing apparatus to perform a process comprising: controlling a display to display an operation target; determining a contact size of an object on the display; and enabling or disabling an operation input for the operation target based on the contact size.

A method performed by an information processing apparatus, the method comprising: controlling a display to display an operation target; determining a contact size of an object on the display; and enabling or disabling, by circuitry of the information processing apparatus, an operation input for the operation target based on the contact size.

Advantageous Effects of Invention

According to the present technology, it is possible to obtain an excellent effect in which it is possible to prevent operational errors of an operation target on the display surface.

BRIEF DESCRIPTION OF DRAWINGS

FIG. 1 is a perspective view which illustrates a configuration example of an appearance of a display control device 100 according to a first embodiment of the present technology.

FIG. 2 is a block diagram which illustrates a functional configuration example of an appearance of the display control device 100 according to the first embodiment of the present technology.

FIG. 3 is a diagram which illustrates an example of a display screen (menu screen 300) which is displayed on an input-output unit 150 according to the first embodiment of the present technology.

FIG. 4 is a diagram which illustrates a relationship between an operation target which is displayed on the input-output unit 150 and a reference size which is maintained in a size information maintaining unit 171 according to the first embodiment of the present technology.

FIG. 5 is a diagram which illustrates an example of a display screen which is displayed on the input-output unit 150 according to the first embodiment of the present technology.

FIG. 6 is a diagram which illustrates an example of a display screen which is displayed on the input-output unit 150 according to the first embodiment of the present technology.

FIG. 7 is a diagram which illustrates an example of a display screen which is displayed on the input-output unit 150 according to the first embodiment of the present technology.

FIG. 8 is a diagram which illustrates an example of a display screen which is displayed on the input-output unit 150 according to the first embodiment of the present technology.

FIG. 9 is a diagram which illustrates an example of a display screen which is displayed on the input-output unit 150 according to the first embodiment of the present technology.

FIG. 10 is a flowchart which illustrates an example of a processing order of display control processing by the display control device 100 according to the first embodiment of the present technology.

FIG. 11 is a flowchart which illustrates an example of a processing order of display control processing by the display control device 100 according to the first embodiment of the present technology.

FIG. 12 is a flowchart which illustrates an example of a processing order of display control processing by the display control device 100 according to the second embodiment of the present technology.

FIG. 13 is a diagram which illustrates an example of a display screen (detecting size measurement screen 500) which is displayed on the input-output unit 150, and a measurement result thereof according to the embodiments of the present technology.

DESCRIPTION OF EMBODIMENTS

Hereinafter, embodiments of the present technology will be described (hereinafter, referred to as embodiments). Descriptions thereof will be made in the following order.
1. First Embodiment (display control: example of determining detailed operation target and simple operation target based on reference size and detection size (contact size))
2. Second Embodiment (display control: example of changing display magnification of operation target based on detection size (contact size))
3. Modification Example 1. First Embodiment "Configuration Example of Appearance of Display Control Device"

FIG. 1 is a perspective view which illustrates a configuration example of an appearance of a display control device 100 according to the first embodiment of the present technology. In FIG. 1, "a" illustrates an appearance of one surface side of the display control device 100 (that is, surface on which input-output unit 150 is provided). In addition, "b" of FIG. 1 illustrates an appearance of the other surface side of the display control device 100 (that is, surface on which lens 121 is provided).

The display control device 100 includes first to fifth buttons 111 to 115, speakers 101 and 102, the lens 121, and the input-output unit 150. For example, the display control device 100 is realized by a radio communication device which is able to display various images (for example, a mobile phone, or a smart phone including call and data communication functions). In addition, it is also possible to provide other operation members in the display control device 100, however, figures and descriptions thereof will be omitted.

The first to fifth buttons 111 to 115 are operation members for performing each operation in the display control device 100.

The speakers 101 and 102 are speakers which output various pieces of sound information. For example, the speaker 101 is a speaker which is used when making a call, and the speaker 102 is a speaker which is used when reproducing contents, or the like.

The lens 121 is a lens which condenses light from a photographic subject.

The input-output unit 150 is a unit which displays various images, and receives an operation input from a user based on a detection state of an object which approaches, or comes into contact with the display surface. In addition, the input-output unit 150 is also referred to as a touch screen, or a touch panel.

"Functional Configuration Example of Display Control Device"

FIG. 2 is a block diagram which illustrates a functional configuration example of the display control device 100 according to the first embodiment of the present technology.

The display control device 100 includes an operation reception unit 110, an imaging unit 120, a recording medium control unit 130, a recording medium 140, the input-output unit 150, an input control unit 160, a control unit 170, a size information maintaining unit 171, and a display control unit 180. In addition, regarding each configuration relating to a radio communication in the display control device 100, figures and descriptions thereof will be omitted.

The operation reception unit 110 is an operation reception unit which receives an operation performed by a user, and outputs a control signal (operation signal) corresponding to a received operation content to the control unit 170. The operation reception unit 110 corresponds to the first to fifth buttons 111 to 115 in FIG. 1.

The imaging unit 120 includes an imaging element which converts light from a photographic subject which is input through the lens (lens 121 illustrated in "b" of FIG. 1), and an image signal processing unit which generates an imaged image (image data) by processing an output signal of the imaging element (imaging signal). That is, in the imaging unit 120, an optical image of the photographic subject which is input through the lens is formed on the imaging surface of the imaging element, the imaging element performs an imaging operation in this state, and the image signal processing unit performs signal processing with respect to the imaging signal, thereby generating an imaged image. A generation of the imaged image is performed based on start instruction information of the imaging operation which is output from the operation reception unit 110, or the reception unit 151. In addition, the generated imaged image is supplied to the recording medium control unit 130, and the display control unit 180.

The recording medium control unit 130 is a unit which performs a control of recording with respect to the recording medium 140, or reading from the recording medium 140, based on a control of the control unit 170. For example, the recording medium control unit 130 causes the recording medium 140 to record the imaged image (image data) which is output from the imaging unit 120 as still image content (still image file). In addition, for example, the recording medium control unit 130 causes the recording medium 140 to record animation content (animation file) in which the imaged image (image data) which is output from the imaging unit 120 and sound data which is output from a sound signal processing unit (not shown) are correlated with each other. In addition, for example, the recording medium control unit 130 reads out the animation content which is stored in the recording medium 140, and outputs the image data which is included in the animation content to the display control unit 180. In addition, the sound data which is included in the animation data is output from the speaker 102 (illustrated in "b" of FIG. 1).

The recording medium 140 is a medium which stores various pieces of information (still image content, or animation content) based on the control of the recording medium control unit 130. In addition, the recording medium 140 supplies the stored various pieces of information to the recording medium control unit 130.

The input-output unit 150 includes a reception unit 151 and a display unit 152. For example, it is possible to use an electrostatic-type (electrostatic capacity type) touch panel which detects contact or the approaching of a conductive object (for example, a human finger) based on a change in an electrostatic capacitance as the reception unit 151. In addition, for example, it is possible to use a display panel such as an LCD (Liquid Crystal Display), an organic EL (Electro Luminescence) panel as the display unit 152. In addition, the input-output unit 150 is configured, for example, by overlapping transparent touch panels with each other on the display surface of the display panel.

The input-output unit 150 displays various images on the display unit 152 based on a control of the display control unit 180, and receives an operation input from a user based on a detection state of an object which approaches, or comes into contact with the display surface (display surface of display unit 152) of the input-output unit 150 by the reception unit 151. In addition, the reception unit 151 outputs a control signal corresponding to the received operation input to the input control unit 160.

The reception unit 151 is a unit which receives an operation input of an object (for example, user's finger) which approaches, or comes into contact with the display surface of the input-output unit 150, based on the detection state of the object. For example, the reception unit 151 includes a plurality of electrostatic sensors which are arranged in a lattice shape. The electrostatic sensors are sensors which increase an electrostatic capacitance when an object (conductive object (for example, human hand, or finger)) approaches, or comes into contact with the display surface of the input-output unit 150. In addition, the reception unit 151 outputs information (information of the electrostatic sensor) including a value of the electrostatic capacitance of the electrostatic sensor, and a position of the electrostatic sensor on the operating surface of the reception unit 151 to the input control unit 160 when the electrostatic capacitance of the electrostatic sensor is changed. In addition, hereinafter, only a detection example of an object which comes into contact with the display surface of the input-output unit 150 is described, however, it is possible to similarly apply to a detection of an object which approaches the display surface of the input-output unit 150. In addition, the reception unit 151 is a detection unit which detects an object which comes into contact with the display surface on which an operation target for performing the operation input is displayed. That is, the reception unit 151 is an example of the detection unit. In addition, the operation target is, for example, displayed on the input-output unit 150 like setting operation images 331 to 334 illustrated in FIG. 3. For example, the operation target is data for performing the operation input, or an object (for example, GUI (Graphical User Interface) parts).

The display unit 152 is a display panel which displays each image based on the control of the display control unit 180. In addition, a display example in the display unit 152 will be shown in FIGS. 3 to 9, or the like.

The input control unit 160 is a unit which performs a control relating to an operation input by a user (for example, touch operation (tap operation)) which is received by the reception unit 151. For example, the input control unit 160 detects a range (contract range) of the display surface of the input-output unit 150 on which a user's finger touched based on the information of the electrostatic sensor which is output from the reception unit 151, and converts the contact range to a coordinate, based on a coordinate axis corresponding to the display surface. In addition, the input control unit 160 calculates a shape of the contact range based on the converted coordinate, and calculates a coordinate of the center of gravity in the shape. In addition, the input control unit 160 calculates the calculated coordinate of the center of gravity as a coordinate of a position (contact position) which a user's finger touched. In addition, the input control unit 160 outputs operation information relating to the shape of the calculated contract range, and the coordinate of the contact position to the control unit 170. The control unit 170 recognizes the operation input of the user on the display surface of the input-output unit 150 based on the operation information (shape of contact range, coordinate of contact position, or the like) which is output from the input control unit 160.

The control unit 170 is a unit which controls each unit of the display control device 100 based on the operation signal from the operation reception unit 110, and the operation information (shape of contact range, coordinate of contact position, or the like) from the input control unit 160. In addition, the control unit 170 maintains a contact size (detected size) of the contact operation by the user which is detected on the display surface of the input-output unit 150 in the size information maintaining unit 171.

In addition, for example, the control unit 170 performs a control which changes operation contents of an operation target based on a contact size (detected size) of an object (for example, user's finger) on the display surface of the input-output unit 150. That is, the control unit 170 changes the operation contents of at least a part of the plurality of operation targets based on the contact size (detected size) of the object on the display surface of the input-output unit 150. For example, the control unit 170 changes the operation contents of the operation targets by disabling the operation input of the operation targets based on the contact size (detected size) of an object on the display surface of the input-output unit 150.

In addition, for example, the control unit 170 changes the operation content based on a comparison result between the contact size (detected size) of the object on the display surface of the input-output unit 150 and the size of the operation target on the display surface of the input-output unit 150. Specifically, the control unit 170 enables the operation input of the operation target based on the contact size (detected size) of the object on the display surface of the input-output unit 150, and when the size of the operation target on the display surface of the input-output unit 150 is large. On the other hand, the control unit 170 disables the operation input of the operation target when the size of the operation target on the display surface of the input-output unit 150 is small. In addition, according to the first embodiment of the present technology, the operation target of which the operation input is disabled is referred to as a simple operation target, and the operation target of which the operation input is enabled is referred to as a detailed operation target.

The size information maintaining unit 171 is a unit which maintains the reference size which is used when determining the simple operation target and detailed operation target, and the contact size (detected size), and supplies each maintained size information to the control unit 170.

Here, the reference size is a value (specified value) which denotes the size of the stylus which is used when performing an operation, or a finger of a standard user, and is preset. In addition, the contact size (detected size) is a value based on the value which is detected in the reception unit 151 (value denoting size of stylus used when performing operation by user, or size of finger of user).

For example, the control unit 170 causes the size information maintaining unit 171 to sequentially maintain the value which is detected in the reception unit 151 (for example, the area in which user's finger touched (contact area)). In addition, the control unit 170 calculates a mean value of the contact area which is maintained in the size information maintaining unit 171, and causes the size information maintaining unit 171 to maintain the mean value as a contact size (detected size). That is, the contact size (detected size) is a mean value of input values which are actually input. However, since it is also considered that a child may use the device after an adult, it is preferable to use the mean value per unit hour as the contact size (detected size).

The display control unit 180 is a unit which causes each image to be output to the display unit 152 based on the control of the control unit 170. For example, the display control unit 180 causes a set screen for performing various setting when performing an imaging operation (for example, menu screen 300 in FIG. 3), or an imaged image which is output from the imaging unit 120 (so-called through image) to be displayed on the display unit 152. In addition, for example, the display control unit 180 causes content which is stored in the recording medium 140 (for example, still image content, or animation content) to be displayed on the display unit 152.

"Display Example of Menu Screen"

FIG. 3 is a diagram which illustrates an example of a display screen (menu screen 300) which is displayed on the input-output unit 150 according to the first embodiment of the present technology. In addition, in FIGS. 3 to 9, or the like, displays of the first to fifth buttons 111 to 115, the speaker 101, or the like are omitted.

The menu screen 300 is a screen in which the operation targets are grouped according to the types thereof in order to look around the whole menu. That is, the grouped operation targets are divided into nine regions in a unit of group in a state of being compactedly displayed (overlook state), and are displayed on one screen (menu screen 300). That is, operation targets which are look similar (for example, items relating to the same function) belong to each group. In addition, the menu screen 300 which is divided into nine regions is an example, and it is also preferable to appropriately change the number of regions according to each operation target as a display target.

Specifically, an imaging mode setting region 310, a flash system setting region 320, a white balance system setting region 330, a reproducing setting region 340, and a diaphragm adjusting region 350 are displayed on the menu screen 300. In addition, a face detection system setting region 360, a guide display system setting region 370, an imaged image size system setting region 380, and an animation system setting region 390 are displayed on the menu screen 300.

The imaging mode setting region 310 is a region in which operation targets which are used when setting the imaging mode (for example, still image imaging mode, and animation imaging mode) are displayed.

The flash system setting region 320 is a region in which operation targets which are used when performing various setting relating to a flash are displayed.

The white balance system setting region 330 is a region in which operation targets which are used when performing various setting relating to a white balance are displayed.

The reproducing setting region 340 is a region in which operation targets for setting reproducing modes, and operation targets which are used when reproducing image content are displayed.

The diaphragm adjusting region 350 is a region in which operation targets which are used when adjusting a diaphragm are displayed.

The face detection system setting region 360 is a region in which operation targets which are used when performing various setting relating to face detection are displayed.

The guide display system setting region 370 is a region in which operation targets which are used when performing various setting relating to a guide function (help function) are displayed.

The imaged image size system setting region 380 is a region in which operation targets which are used when performing various settings relating to a size of an imaged image as a recording target are displayed. For example, an aspect ratio of an imaged image (still image) as a recording target (for example, 4:3 or 16:9), or an image size of an imaged image (still image) as a recording target (STD, or WIDE) can be set.

The animation system setting region 390 is a region in which operation targets which are used when performing various settings relating to an animation are displayed.

In addition, the operation targets, regions or the like which are displayed on the menu screen 300 are examples, and it is also preferable to appropriately perform changing according to the set mode, the imaging operation state, or the like.

In addition, the operation targets (items) on the menu screen 300 or the like are operation region images (operation mark) which are used when performing the operation input by a user, and for example, the operation targets can be operated using a contact operation by a user (for example, touch operation, and tracing operation (dragging operation)). However, on the menu screen 300, only an operation target (detailed operation target) corresponding to a contact size (detected size) in the contact operation by a user, and other operation targets (simple operation target) are disabled from being operated. For this reason, in order to operate the operation targets which are disabled from being operated (simple operation target), it is necessary to perform a selecting operation (touch operation) of selecting a region in which the operation targets are displayed (310, . . . , 390), and display a display screen in which the region is displayed by being enlarged (zoom state). The display examples are illustrated in FIGS. 6, 8, and 9.

For example, a case is assumed in which a touch operation is performed using a user's finger 10 in the input-output unit 150 in a state where the menu screen 300 is displayed on the input-output unit 150. In this case, the control unit 170 specifies at which position of the menu screen 300 the touch operation has been performed. That is, the control unit 170 specifies the position on the display surface of the input-output unit 150 which a user's finger touched (contact position) based on the operation input which is output from the input control unit 160. In addition, the control unit 170 performs a process corresponding to the detailed operation target when the contact position is included in the detailed operation target. On the other hand, the control unit 170 performs a control in which a region to which the contact position is included (310, . . . , 390) is enlarged, and is displayed on the input-output unit 150 when the contact position is not included in the detailed operation target (including case in which the contact position is included in the simple operation target). For example, an example of an enlarged display in a case where the touch operation using the user's finger 10 is performed in the white balance system setting region 330 is illustrated in FIG. 6.

Here, it is possible to smoothly perform a movement, or grasping between data items, by performing switching or expanded, or compacted displaying of a virtual space to a view point position displaying. In addition, a user is able to perform an easy operation since it is possible for a user to pay attention to an operation target which is in the user's mind by performing an expanded displaying.

However, for example, it is assumed that there is also a case where an operation target which is different from the operation target intended by a user is touched, or a case where two or more operation targets are touched since each operation target is displayed compactedly when the menu screen 300 is displayed. In addition, the case where two or more operation targets are touched against the will of the user is referred to as a conflict.

Therefore, the operation is performed such that the size of the stylus, or a finger of a user (reference size) on the side which performs an operation is uniquely defined in advance, and a display state in which the operation is disabled, or a region in which the operation is disabled is statically defined according to the display state. In this manner, it is possible to prevent occurrences of the conflict, or an erroneous operation when operating the compactedly displayed operation target. However, when a difference between the defined value (reference size) and the size of the stylus, or the finger of the user is large, a case is also assumed in which the operation target is erroneously operated.

In particular, in a virtual space in which the display magnification can be expanded or compacted without steps, an operation target which is viewed as an operation target which can be operated in practice is limited according to a relatively large specified value (reference value) when it is different from the size of the specified value (reference value), and becomes difficult to be operated. On the other hand, it is also assumed that the operation target becomes the conflict, or is erroneously operated according to a relatively small specified value (reference value).

Therefore, according to the first embodiment of the present technology, the detailed operation target, and the simple operation target are determined using the reference size and the detected size together.

"Example of Determination of Detailed Operation Target and Simple Operation Target"

FIG. 4 is a diagram which illustrates a relationship between the operation target which is displayed on the input-output unit 150 and the reference size which is maintained in the size information maintaining unit 171 according to the first embodiment of the present technology.

In FIG. 4, "a" illustrates an example of a relationship between a reference size 200 and an operation target which is displayed by being enlarged. In addition, "b" of FIG. 4 illustrates an example of relationship between the reference size 200 and an operation target which is displayed by being compacted. In addition, in "a" and "b" of FIG. 4, setting operation images (operation targets) 331 to 334 in the white balance system setting region 330 in FIG. 3 are exemplified.

In addition, as described above, it is possible to perform the expansion and con-traction by a user's operation, in each region included in the menu screen 300, and in "a" and "b" of FIG. 4, the white balance system setting region 330 having a different display magnification is assumed to be described.

The setting operation images 331 to 334 are displayed in the white balance system setting region 330. The setting operation images 331 to 334 are operation images which are used when adjusting the white balance at the time of setting the imaging mode. For example, the white balance can be adjusted by the contact operation of the setting operation images 331 to 334.

In addition, a size which is used as a comparison target (reference size, detected size (contact size), and size of operation target) according to the embodiment of the present technology means an area on the display surface of the input-output unit 150. However, it is also preferable to use a value which is specified by a shape or the like thereof (for example, an area which is specified by rectangle surrounding operation target).

Here, as shown in "a" of FIG. 4, a case is assumed in which the reference size 200 is smaller than the sizes of the setting operation images 331 to 334. In this case, it is highly possible that an operation target which is intended by a user (setting operation images 331 to 334) is able to be operated in detail. For this reason, the control unit 170 determines the operation target which is larger than the reference size 200 as the detailed operation target. In this manner, the operation target which is determined to be the detailed operation target can be operated using the user's contact operation on the display surface of the input-output unit 150.

In addition, as shown in "b" of FIG. 4, a case is assumed in which the reference size 200 is larger than the size of the setting operation images 331 to 334. In this case, there is a concern that the erroneous operation in which an operation target (for example, setting operation image 333) different from the operation target which is intended by a user (for example, setting operation image 331) is erroneously operated, or the conflict may occur. For this reason, the control unit 170 determines an operation target of which the size is smaller than the reference size 200 as the simple operation target. In this manner, the operation using a user's contact operation on the display surface of the input-output unit 150 is disabled with respect to the operation target which is determined to be the simple operation target.

Here, a relationship between the reference size which is maintained in the size information maintaining unit 171 and the detected size (contact size) will be described.

For example, a case is assumed in which the detected size is relatively smaller than the reference size. In this case, it is assumed that even if it is an operation target of a relatively small size, the operation target can be operated using an operation object (for example, finger) in many cases. That is, even if it is a simple operation target which is determined based on the reference size, there is a possibility that the simple operation target can be operated in detail according to the will of a user. For this reason, the control unit 170 newly determines the simple operation target of which the size is larger than the detected size as the detailed operation target. In this manner, it is possible to perform the operation using the user's contact operation on the display surface of the input-output unit 150 with respect to the operation target which is newly determined to be the detailed operation target.

On the other hand, for example, a case is assumed in which the detected size is relatively larger than the reference size. In this case, it is assumed that even if it is an operation target of a relatively large size, the operation target cannot be operated using the operation object (for example, finger) in many cases. That is, there is a concern that the erroneous operation in which an operation target which is different from the operation target (for example, setting operation image 333) intended by a user (for example, setting operation image 331) is erroneously operated, or the conflict may occur. For this reason, the control unit 170 newly determines a detailed operation target (detailed operation target which is determined based on reference size) of which the size is smaller than the detected size as the simple operation target. In this manner, the operation using the user's contact operation on the display surface of the input-output unit 150 is disabled with respect to the operation target which is newly determined to be the simple operation target.

In this manner, a detailed operation target and simple operation target are newly determined based on the detected size with respect to the detailed operation target and simple operation target which are determined based on the reference size. That is, it is possible to perform an appropriate determination (determination on detailed operation target and simple operation target) according to a size (detected size) of an operation object (for example, finger) which is operated in practice. In this manner, it is possible to prevent the occurrences of erroneous operation and conflict.

"Display Example of Operation Target"

FIGS. 5 to 9 are diagrams which illustrate examples of display screens which are displayed on the input-output unit 150 according to the first embodiment of the present technology. In FIGS. 5 to 9, examples of relationships between the size of the operation object (for example, finger 10, hand 20) and the detailed operation target, and the simple operation target are simplified and illustrated.

FIG. 5 illustrates the menu screen 300 a case where a contact operation is performed using a finger 10 as the operation object. In addition, the menu screen 300 illustrated in FIG. 5 is the same as that in FIG. 3. However, among the operation targets which are displayed on the menu screen 300 (for example, setting operation screens 331 to 334), only the operation targets which are surrounded by dotted lined-rectangles 401 and 402 are set to the detailed operation target. For this reason, in the menu screen 300, it is possible to perform only the contact operation of the operation of selecting the nine regions (310, . . . , 390), and the operation of the detailed operation targets which are surrounded with the dotted lined-rectangles 401 and 402.

In addition, it is also preferable to display the detailed operation target and the simple operation target using a different display form so as to be easily distinguished from each other by a user. For example, it is possible to highlight the detailed operation target (displaying detailed operation target brighter than simple operation target). In addition, it is also preferable to display the detailed operation target in blue when the menu screen 300 is a display screen which is based on white. In addition, it is also preferable to display the detailed operation target such that the detailed operation target is minute, and is repeatedly displayed by being expanded, or compacted (For example, detailed operation target is displayed in a feeling of moving lightly).

Here, it is possible to operate the operation targets other than the detailed operation targets (simple operation target (for example, setting operation images 331 to 334)) which are surrounded with the dotted lined-rectangles 401 and 402 by displaying each region to be enlarged.

For example, since the setting operation images (simple operation targets) 331 to 334 which are displayed in the white balance system setting region 330 are operated, an example in which the white balance system setting region 330 is displayed by being enlarged is illustrated in FIG. 6.

A menu screen 410 which is displayed when a touch operation with respect to the white balance system setting region 330 is performed by the user on the menu screen 300 shown in FIG. 5 is illustrated in FIG. 6. That is, the menu screen 410 is a screen in which the white balance system setting region 330 is enlarged. In this manner, one screen (menu screen 410) is displayed in a unit of group in a state where the grouped operation targets are displayed by being enlarged (zoom state).

In the menu screen 410, the setting operation images (detailed operation targets) 331 to 334 are displayed. In addition, the setting operation images (detailed operation targets) 331 to 334 are the same as those in FIG. 4.

As shown in FIGS. 5 and 6, the menu screen in a compacted display state (overlook state) in which the operation targets are displayed by being compacted, and the menu screen in an enlarged display state (zoom state) in which the operation targets are displayed by being enlarged are displayed on the display control device 100. In addition, the display on these menu screens are switched by a user's operation (for example, contact operation on display surface of input-output unit 150, or pressing operation of first to third buttons 111 to 113).

Here, it is assumed that all of the setting operation images 331 to 334 which are displayed on the menu screen 410 are the detailed operation targets (illustrated by being surrounded by dotted lined-rectangles 411 to 414). For this reason, in the menu screen 410, it is possible to perform the contact operation with respect to all of the setting operation images 331 to 334.

Here, for example, it is assumed that the contact operation is performed by the operation object of which the detected size is larger than the size of the setting operation images 331 to 334 in the menu screen 410. For example, as illustrated in FIG. 7, it is also assumed that the contact operation is performed using a hand 20 in a state of a rock as the operation object. Therefore, in FIGS. 7 to 9, examples of a relationship between the detailed operation target and the simple operation target in a case where the contact operation is performed by the operation object of which the detected size is relatively large.

FIG. 7 illustrates the menu screen 300 which is displayed when the contact operation is performed using the back of the hand 20 in the state of a rock as the operation object. For example, it is assumed that the contact operation is performed in a state where the hand 20 grasps something. In addition, the menu screen 300 illustrated in FIG. 7 is the same as that in FIG. 3.

However, it is assumed that all of the operation targets displayed on the menu screen 300 (for example, setting operation images 331 to 334) are the simple operation targets. For this reason, it is possible to perform only the selecting operation of the nine region (310, . . . , 390) on the menu screen 300 using the contact operation.

For this reason, it is necessary to display each region by enlarging the region in order to perform the contact operation with respect to each operation target (simple operation target, (for example, setting operation images 331 to 334)). For example, in order to operate the setting operation images (simple operation targets) 331 to 334 which are displayed in the white balance system setting region 330, an example in which the white balance system setting region 330 is displayed by being enlarged is illustrated in FIG. 8.

FIG. 8 illustrates the menu screen 410 which is displayed when the touch operation with respect to the white balance system setting region 330 is made by a user on the menu screen 300 shown in FIG. 7. In addition, the menu screen 410 illustrated in FIG. 8 is the same as that in FIG. 6.

However, it is different in that all of the operation targets which are displayed on the menu screen 410 (setting operation images 331 to 334) are the simple operation targets.

For this reason, it is necessary to display each region by further enlarging the region in order to perform the contact operation with respect to each operation target (setting operation images 331 to 334). For example, in order to operate the setting operation image (simple operation target) 331, an example in which the setting operation image (simple operation target) 331 is displayed by being enlarged is illustrated in FIG. 9.

In FIG. 9, a menu screen 420 which is displayed when the operation of enlarging the setting operation image 331 is performed by a user (for example, touch operation in vicinity of setting operation image 331) on the menu screen 410 shown in FIG. 8 is illustrated. That is, the menu screen 420 is a screen in which the setting operation image 331 is enlarged.

Here, it is assumed that the setting operation image 331 which is displayed on the menu screen 420 is the detailed operation target (illustrated by being surrounded by dotted lined-rectangle 421). For this reason, it is possible to perform the contact operation of the setting operation image 331 on the menu screen 420.

In this manner, it is necessary to display the operation target by enlarging the target to a size of the detected size when the contact operation is performed by an operation target of which the detected size is a relatively large.

"Operation Example of Display Control Device"

FIGS. 10 and 11 are flowcharts which illustrate one example of a processing order of a display control processing order by the display control device 100 according to the first embodiment of the present technology.

Initially, the control unit 170 determines whether or not a display instructing operation of the menu screen has been performed (step S901), and performs monitoring continuously when the display instructing operation of the menu screen is not performed. When the display instructing operation of the menu screen has been performed (step S901), the control unit 170 determines the detailed operation target and simple operation target based on the reference size which is maintained in the size information maintaining unit 171 (step S902). That is, each operation target as the display target which is included in the menu screen is determined to be any of the detailed operation target and simple operation target (step S902).

Subsequently, the display control unit 180 displays the menu screen on the display unit 152 based on an instruction of the control unit 170 (step S903). For example, the menu screen 300 illustrated in FIG. 3 is displayed. Here, among the operation targets which are displayed on the menu screen, the detailed operation target can be operated, however, in contrast to this, the simple operation target cannot be operated.

Subsequently, the control unit 170 determines whether or not the operation has been performed by a user (step S904), and continues monitoring when the operation by a user has not been performed. On the other hand, when the operation by a user has been performed (step S904), the control unit 170 determines whether or not the operation is an operation of completing a display of the menu screen (step S905). In addition, when the operation is the operation of completing the display of the menu screen (step S905), the operation of display control processing is completed.

When the operation is the operation of completing the display of the menu screen (step S905), the control unit 170 determines whether or not the contact operation on the display surface of the input-output unit 150 has been performed (step S906), and when the contact operation has not been performed, the process proceeds to step S908. When the contact operation on the display surface of the input-output unit 150 has been performed (step S906), the control unit 170 obtains a size of the operation object (for example, finger) (for example, contact area) based on the contact operation, and causes the size information maintaining unit 171 to maintain the size information (step S907). In this case, a mean value of the past size (for example, contact area) is calculated, and the mean value is maintained in the size information maintaining unit 171 as the detected size (contact size). In addition, step S906 is an example of a detecting order.

Subsequently, the control unit 170 determines whether or not the operation is a changing operation of a display magnification (step S908). In addition, when the operation is the changing operation of the display magnification (step S908), the control unit 170 determines the detailed operation target and the simple operation target relating to the display magnification after changing based on the reference size which is maintained in the size information maintaining unit 171 (step S909). That is, the detailed operation target and simple operation target are newly determined with respect to each operation target included in the menu screen having the display magnification after changing (step S909). Subsequently, the display control unit 180 causes the display unit 152 to display the menu screen using the changed display magnification (step S910) based on an instruction of the control unit 170, and the process returns to step S904.

In addition, when the operation is not the changing operation of the display magnification (step S908), the control unit 170 performs processing according to the operation (step S911). Subsequently, the control unit 170 determines whether or not the detected size is maintained in the size information maintaining unit 171 (step S912), and the process returns to step S904 when the detected size is not maintained in the size information maintaining unit 171.

When the detected size is maintained in the size information maintaining unit 171 (step S913), the control unit 170 compares the reference size which is maintained in the size information maintaining unit 171 and the detected size with each other (step S913). In addition, when the detected size is smaller than the reference size by a predetermined value or more (step S913), the control unit 170 determines an operation target which is set to be operated by the detected size as the detailed operation target, among the simple operation targets included in the menu screen (step S914). That is, the operation target which is set to be operated by the detected size among the simple operation targets included in the menu screen which is displayed on the display unit 152 is changed to the detailed operation target from the simple operation target (step S914).

In addition, when the detected size is smaller than the reference size by a predetermined value or more (step S913), the control unit 170 determines whether or not the detected size is larger than the reference size by the predetermined value or more (step S915). When the detected size is larger than the reference size by the predetermined value or more (step S915), the control unit 170 determines the operation target which is difficult to operate (cannot be operated) due to the detected size, among the detailed operation targets included in the menu screen as the simple operation target (step S916). That is, among the detailed operation targets which are included in the menu screen displayed on the display unit 152, the operation target which is difficult to operate due to the detected size is changed to the simple operation target from the detailed operation target (step S916).

In addition, when the detected size is not larger than the reference size by the predetermined value or more (for example, approximately the same as detected size and reference size) (step S915), the process proceeds to step S904. In addition, steps S913 to S916 are examples of control orders.

In this manner, according to the first embodiment of the present technology, the size of the stylus, or the finger which is used when performing the operation is measured, and an operation target which is predicted to be difficult to be operated according to the display state is dynamically limited to the simple operation target from the detailed operation target. In addition, even when the size of the operation target to be operated is different from the size which is specified by being assumed in advance (reference size), or even when the enlarged and compacted display in a virtual space is changed to any display magnification, it is possible to prevent the occurrence of the conflict, or erroneous operation. That is, it is possible to prevent the occurrence of the conflict, or erroneous operation in the virtual space in which the view point position is switched, or the enlarged and compacted display is performed, by measuring the size of the stylus, or the finger which is used when performing the operation, and dynamically re-flecting it for a determining process of the operation target according to the display state.

In addition, according to the first embodiment of the present technology, an example in which a new determining process is performed using the detected size with respect to the detailed operation target and simple operation target which are determined based on the reference size is described. However, it is also preferable to determine the detailed operation target and the simple operation target based only on the detected size.

Other Determination Examples

Hitherto, an example in which the detailed operation target and simple operation target which are determined based on the size of the operation target on the display screen, and a comparison result between the reference size and the detected size has been described. However, for example, even when the size of the operation target on the display screen is relatively small, the operation target is considered to be operated when other operation targets are not present in the periphery thereof, or the like.

Therefore, an example in which other elements than the size of the operation target on the display screen are used in determining is described.

Initially, a determination example in which the number of operation targets in the display screen (or, in a region of a predetermined range) is set to a determination element will be described. For example, when there is one operation target which is present on the display screen (or in a region of the predetermined range), the operation target is considered to be operated, even when the size of the operation target on the display screen is remarkably smaller than the detected size. For this reason, when there is one operation target which is present on the display screen (or in region of the predetermined range), the operation target is determined to be the detailed operation target. That is, even when the operation target is remarkably smaller than the detected size, the operation target is determined to be the detailed operation target when there is nothing in the periphery thereof.

In this manner, the control unit 170 enables the operation input of an operation target when a predetermined condition is satisfied even when it is the operation target of which the operation input is determined to be disabled based on the contact size of an object on the display surface. In addition, a case where the predetermined condition is satisfied is, for example, a case in which the number of the operation target and other operation targets which is present in a predetermined region on the display surface is less than a predetermined number (for example, 1).

Subsequently, a determination example in which a distance between the operation targets on the display surface is set to a determination element will be described. For example, a case is assumed in which a plurality of operation targets are present in the display screen (or, in a region of a predetermined range). In this case, when the size of each of the operation targets on the display screen (for example, length in direction in which two operation targets are connected) is larger than the distance between two operation targets by a predetermined value or more, these two operation targets are considered to be difficult to operate (cannot be operated). For this reason, when the size of each operation target on the display surface is larger than the distance between the two operation targets by the predetermined value or more, the operation target is determined to be the simple operation target.

In this manner, the control unit 170 disables the operation input of the two operation targets when the distance between the two operation targets among the plurality of operation targets on the display surface is small based on the value which is specified by the contact size of the object on the display surface.

That is, since the occurrence of the erroneous operation in which an operation target different from the operation target which is intended by a user is operated, or the conflict is prevented, it is possible to determine the detailed operation target and the simple operation target based on the interval of the operation targets, a positional relationship thereof, and the number thereof.

2. Second Embodiment

According to the first embodiment of the present technology, an example in which the detailed operation target and the simple operation target are determined based on the reference size and the detected size has been described. Here, when an operation target of which the operation on the display surface is difficult is present, it is also considered that a display magnification thereof is changed, and an operation of the operation target is enabled.

Therefore, according to a second embodiment of the present technology, an example has been described in which the display magnification is changed (for example, enlarging), and the operation of the operation target is enabled, when the operation target of which the operation on the display surface is difficult is present. In addition, a configuration of a display control device according to the second embodiment of the present technology is approximately the same as the examples illustrated in FIGS. 1 and 2, or the like. For this reason, regarding portions which are common to the first embodiment of the present technology, a part of descriptions thereof will be omitted.

"Operation Example of Display Control Device"

FIG. 12 is a flowchart which illustrates an example of a processing order of a display control processing by the display control device 100 according to the second embodiment of the present technology. In addition, a detected size as history information is sequentially maintained in the size information maintaining unit 171. In addition, regarding steps S921 and S922, descriptions thereof will be omitted since they have the same processing order as those of steps S906 and S907 illustrated in FIG. 10.

A control unit 170 compares a detected size which is obtained this time to a detected size in the past which is maintained in a size information maintaining unit 171, and determines whether or not these are different from each other by a predetermined value or more (step S923). In addition, when the two detected sizes are in a range of the predetermined value (step S923), the operation of the display control processing is completed.

When the two detected sizes are the predetermined value or more (step S923), the control unit 170 determines whether or not an operation target of which the operation is difficult (cannot be operated) due to the size which is detected this time is present among the operation targets which are included in the menu screen (step S924). In addition, when there is no operation target of which the operation is difficult (cannot be operated) due to the size which is detected this time (step S924), the operation of display control processing is completed.

In addition, when there is an operation target of which the operation is difficult (cannot be operated) due to the size which is detected this time (step S924), the control unit 170 calculates a display magnification in which the operation target of which the operation is difficult (cannot be operated) can be operated using the detected size of this time (step S925). That is, a display magnification in which all of operation targets included in the menu screen become the detailed operation target is calculated. Subsequently, a display control unit 180 displays the menu screen with the calculated display magnification on a display unit 152 based on an instruction of the control unit 170 (step S926). For example, the menu screen is displayed by being enlarged and having a position at which the latest contact operation has been performed as the center position.

In addition, it is also preferable to display a simple operation target which is performed with a contact operation, and the vicinity thereof by enlarging, only when the contact operation is performed by a user with respect to the simple operation target which is displayed on the display unit 152.

In this manner, the control unit 170 performs a control for changing a display content of an operation target based on the contact size of an object on the display surface. Specifically, when there is an operation target of which the operation input is determined to be disabled based on the contact size of an object on the display surface, the control unit 170 performs a control for displaying the operation target by enlarging to a size by which the operation input of the operation target is enabled.

3. Modification Example

According to the first and second embodiments of the present technology, examples in which detected sizes are obtained using the operation input in the middle of operating the display control device 100 (contact operation on display surface of input-output unit 150) has been described. Here, obtaining a detected size on a measurement screen for measuring the detected size is also considered. Therefore, hereinafter, an example of obtaining a detected size on the measurement screen will be described.

"Measurement Example of Detected Size"

FIG. 13 is a diagram which illustrates an example of a display screen (detected size measurement screen 500) which is displayed on an input-output unit 150 according to the embodiments of the present technology, and the measurement result. In addition, a measuring method illustrated in FIG. 13 can be realized, for example, by a method integrated into a calibration procedure which is performed on a precision adjustment screen of a general touch panel.

In FIG. 13, "a" illustrates the detected size measurement screen 500 for measuring a detected size. A contact position image 501 and a tracing direction image 502 are displayed on the detected size measurement screen 500. When measuring of a detected size is performed on the detected size measurement screen 500, a user touches the contact position image 501 with an object (for example, user's finger 50) which is used when performing the operation input on the display surface of the input-output unit 150. Subsequently, the user moves the finger 50 along an arrow of the tracing direction image 502 in a state where the finger 50 comes into contact with the display surface of the input-output unit 150.

In this manner, it is possible to measure a contact size of the finger 50 (detected size) when the user performs the contact operation of the finger 50, and the tracing operation on the detected size measurement screen 500. In addition, in this example, an example in which the contact size (detected size) of the finger 50 is measured by performing the contact operation and the tracing operation is illustrated, however, it is also preferable to measure the contact size (detected size) of the finger 50 by performing any one of the operations.

In FIG. 13, "b" simplifies and illustrates detected sizes 511 and 512 which are measured by the contact operation and the tracing operation on the detected size measurement screen 500.

For example, the detected size becomes large, or small according to a finger size of a user which is used when performing an operation, or an intensity of contact with the display surface. In addition, since it is also assumed that an object other than the finger (for example, a device such as stylus) is used when performing the operation, the detected size becomes large, or small according to the object which is used in the operation.

For example, the detected size 511 denotes a measurement example in a case where a relatively small object is used, and the detected size 512 denotes a measurement example in a case where the finger size of the user which is used in the operation is relatively large. In addition, the finger size shown in "b" of FIG. 13, or the like, is illustrated in a size which can be easily recognized for easy descriptions.

In this manner, the control unit 170 calculates a detected size based on operation information which is output from the input control unit 160. In addition, the control unit 170 maintains the calculated detected size in the size information maintaining unit 171.

In addition, according to the embodiment of the present technology, an example in which an electrostatic-type (electrostatic capacity method) touch panel has been described, however, it is also possible to use a pressure sensitive (resistive film type) touch panel, or an optical touch panel.

In addition, according to the embodiments of the present technology, a display control device such as a radio communication device has been described as an example. However, it is possible to apply the embodiments of the present technology to other display control devices (electronic devices) in which a view point position of the virtual space can be switched, or the enlarged and compacted display is possible. For example, it is possible to apply the embodiments of the present technology to ap-pliances such as a digital still camera, a digital video camera (for example, camera-integrated recorder), a digital photo frame, a smart phone, a tablet, a digital signage terminal, an automatic vending machine and a car navigation system.

In addition, the above described embodiments are examples for embodying the present technology, matters according to the embodiment, and identified matters of the invention in claims are correlated with each other, respectively. Similarly, the specified matters of the invention in claims, and matters according to the embodiments of the present technology with the same name as the specified matters of the invention are correlated with each other, respectively. However, the present technology is not limited to these embodiments, and can be realized by performing various modifications in the embodiments without departing from the scope of the invention.

In addition, the processing order which is described in the above described embodiments may be understood as a method including these series of procedures, and may be understood as a program for causing a computer to execute these series of procedures, and a recording medium which stores the program. As the recording medium, for example, it is possible to use a CD (Compact Disc), an MD (Mini-Disc), a DVD (Digital Versatile Disk), a memory card, a flexible disc(Blu-ray Disc (registered trade mark)).

In addition, the present technology is also able to have a configuration as follows.

(1) An information processing apparatus comprising: circuitry configured to control a display to display an operation target; determine a contact size of an object on the display; and enable or disable an operation input for the operation target based on the contact size.

(2) The information processing apparatus of (1), wherein the processing circuitry is configured to compare the contact size to a threshold value.

(3) The information processing apparatus of (2), wherein the processing circuitry is configured to determine the threshold value based on a size of the operation target.

(4) The information processing apparatus of any of (2) to (3), wherein the processing circuitry is configured to enable or disable the operation input for the operation target based on the comparison.

(5) The information processing apparatus of any of (2) to (4), wherein the circuitry is configured to enable an operation input for the operation target when the contact size is less than the threshold value.

(6) The information processing apparatus of any of (2) to (5), wherein the circuitry is configured to disable an operation input for the operation target when the contact size is greater than the threshold value.

(7) The information processing apparatus of any of (2) to (6), wherein the circuitry is configured to display at least a first operation target and a second operation target, wherein a display size of the first operation target is greater than a display size of the second operation target.

(8) The information processing apparatus of (7), wherein the circuitry is configured to enable an operation input for the first operation target when an operation input for the first operation target when the contact size is greater than the threshold value.

(9) The information processing apparatus of (7), wherein the circuitry is configured to disable an operation input for the second operation target when the contact size is greater than the threshold value.

(10) The information processing apparatus of (7), wherein the circuitry is configured to control the display to display an enlarged version of the second operation target when the contact size is greater than the threshold value.

(11) The information processing apparatus of (10), wherein the circuitry is configured to enable an operation input for the enlarged version of the second operation target when a subsequent operation input is received having a contact size that is greater than the predetermined threshold value.

(12) The information processing apparatus of (7), wherein the circuitry is configured to disable an operation input for the first operation target and the second operation target when the contact size is greater than the threshold value.

(13) The information processing apparatus of (12), wherein the circuitry is configured to determine a contact location of the object on the display, and display an enlarged version of one of the first operation target and the second operation target based on the contact location when the contact size is greater than the threshold value.

(14) The information processing apparatus of (13), wherein the circuitry is configured to enable an operation input for the enlarged version of one of the first operation target and the second operation target when a subsequent operation input is received having a contact size that is greater than the predetermined threshold value.

(15) The information processing apparatus of (2), wherein the circuitry is configured to control the display to display at least a first operation target and a second operation target and identify a distance on the display between the first operation target and the second operation target.

(16) The information processing apparatus of (15), wherein the circuitry is configured to disable an operation input for the first operation target and the second operation target when the distance is less than a predetermined threshold and the contact size is greater than the threshold value.

(17) The information processing apparatus of claim 15, wherein the circuitry is configured to enable an operation input for the first operation target and the second operation target when the distance is greater than a predetermined threshold value and the contact size is greater than the threshold value.

(18) The information processing apparatus of any of (1) to (17), wherein the circuitry is configured to identify a number of operation targets displayed on the display.

(19) The information processing apparatus of (18), wherein the circuitry is configured to disable the operation input when the number of operation targets displayed on the display exceeds a threshold value.

(20) The information processing apparatus of any of (18) to (19), wherein the circuitry is configured to enable the operation input when the number of operation targets displayed on the display is less than a threshold value.

(21) A non-transitory computer-readable medium including computer program instructions, which when executed by an information processing apparatus, causes the information processing apparatus to perform a process comprising: controlling a display to display an operation target; determining a contact size of an object on the display; and enabling or disabling an operation input for the operation target based on the contact size.

(22) A method performed by an information processing apparatus, the method comprising: controlling a display to display an operation target; determining a contact size of an object on the display; and enabling or disabling, by circuitry of the information processing apparatus, an operation input for the operation target based on the contact size.

(23) A display control device which includes:
a detection unit which detects an object which comes into contact with a display surface on which an operation target for which an operation input is performed is displayed; and
a control unit which performs a control for changing an operation content of the operation target based on a contact size of the object on the display surface.

(24) The display control device described in (23),
in which the plurality of operation targets are displayed on the display surface, and in which the control unit changes at least a part of the operation contents among the plurality of operation targets based on the contact size of the object on the display surface.

(25) The display control device described in (24), in which, when a distance between two operation targets among the plurality of operation targets on the display surface is small based on a value which is specified by the contact size of the object on the display surface, the control unit disables the operation input of the two operation targets.

(26) The display control device described in any one of (23) to (25), in which the control unit changes the operation content based on a comparison result between the contact size of the object on the display surface and a size of the operation target on the display surface.

(27) The display control device described in (26), in which the control unit enables the operation input of the operation target when the size of the operation target on the display surface is large, and disables the operation input of the operation target when the size of the operation target on the display surface is small, based on the contact size of the object on the display surface.

(28) The display control device described in (23), in which, the control unit changes the operation content of the operation target by disabling the operation input of the operation target based on the contact size of the object on the display surface.

(29) The display control device described in (23), in which the control unit enables the operation input of the operation target when the number of operation targets and other operation targets which are present in a predetermined area on the display surface is in a predetermined number, even for an operation target which is determined to be an operation target of which the operation input is not possible, based on the contact size of the object on the display surface.

(30) The display control device described in (23), in which the control unit performs a control for displaying the operation target by enlarging the operation target up to a size which enables the operation input of the operation target when there is an operation target of which the operation input is determined to be disabled based on the contact size of the object on the display surface.

(31) A display control device which includes:
a detection unit which detects an object which comes into contact with a display surface on which an operation target for which an operation input is performed is displayed; and
a control unit which performs a control for changing a display content of the operation target based on a contact size of the object on the display surface.

(32) A method of controlling a display control device which includes:
a detection procedure in which an object which comes into contact with a display surface on which an operation target for which an operation input is performed is displayed is detected; and
a control procedure in which an operation content of the operation target is changed based on a contact size of an object on the display surface.

(33) A program which causes a computer to execute:
a detection procedure in which an object which comes into contact with a display surface on which an operation target for which an operation input is performed is displayed is detected; and
a control procedure in which an operation content of the operation target is changed based on a contact size of an object on the display surface.

REFERENCE SIGNS LIST

100 DISPLAY CONTROL DEVICE
101, 102 SPEAKER
110 OPERATION RECEPTION UNIT
111 FIRST BUTTON
112 SECOND BUTTON
113 THIRD BUTTON
114 FOURTH BUTTON
115 FIFTH BUTTON
120 IMAGING UNIT
121 LENS
130 RECORDING MEDIUM CONTROL UNIT
140 RECORDING MEDIUM
150 INPUT-OUTPUT UNIT
151 RECEPTION UNIT
152 DISPLAY UNIT
160 INPUT CONTROL UNIT
170 CONTROL UNIT
171 SIZE INFORMATION MAINTAINING UNIT
180 DISPLAY CONTROL UNIT

The invention claimed is:

1. An information processing apparatus, comprising:
a display; and
circuitry configured to
cause the display to display a first icon and a plurality of second icons, the first icon being displayed in a first size, the plurality of second icons each being displayed in a second size smaller than the first size, and each being displayed in a unit of a group, perform a first process corresponding to the first icon in a case that a touch operation to the first icon is input by a human finger, cause the display to display the plurality of second icons enlarged in a case that a touch operation to the plurality of second icons is input by the human finger, cause the display to display a first image including the first icon with display magnification in case that a touch operation on the display is input by a human hand.

2. The information processing apparatus according to claim 1, wherein the circuitry is further configured to detect a contact size of the human hand on the display, which is larger than a contact size of the human finger on the display.

3. The information processing apparatus according to claim 1, wherein the circuitry is further configured to detect a contact size of the human finger on the display, the contact size being larger than the second size.

4. The information processing apparatus according to claim 1, wherein the circuitry is further configured to perform the first process, which corresponds to reproducing image content.

5. The information processing apparatus according to claim 1, wherein the first icon is displayed in a first area and the plurality of second icons are displayed in a second area, and a size of the first area is identical to a size of the second area.

6. A non-transitory computer-readable medium encoded with computer-readable instructions that, when executed by processing circuitry, cause the processing circuitry to perform an information processing method, comprising:

causing the display to display a first icon and a plurality of second icons, the first icon being displayed in a first size, the plurality of second icons each being displayed in a second size smaller than the first size, and each being displayed in a unit of a group, performing a first process corresponding to the first icon in a case that a touch operation to the first icon is input by a human finger, causing the display to display the plurality of second icons enlarged in a case that a touch operation to the plurality of second icons is input by the human finger, causing the display to display a first image including the first icon with display magnification in case that a touch operation on the display is input by a human hand.

7. The non-transitory computer-readable medium according to claim 6, wherein a contact size of the human hand on the display is larger than a contact size of the human finger on the display.

8. The non-transitory computer-readable medium according to claim 6, wherein a contact size of the human finger on the display is larger than the second size.

9. The non-transitory computer-readable medium according to claim 6, wherein the first process corresponds to reproducing image content.

10. The non-transitory computer-readable medium according to claim 6, wherein the first icon is displayed in a first area and the plurality of second icons are displayed in a second area, and a size of the first area is the same as a size of the second area.

* * * * *